(12) United States Patent
Anderson

(10) Patent No.: US 9,323,749 B2
(45) Date of Patent: Apr. 26, 2016

(54) PROFILING DATA WITH LOCATION INFORMATION

(71) Applicant: Ab Initio Technology LLC, Lexington, MA (US)

(72) Inventor: Arlen Anderson, Kidlington (GB)

(73) Assignee: Ab Initio Technology LLC, Lexington, MA (US)

( * ) Notice: Subject to any disclaimer, the term of this patent is extended or adjusted under 35 U.S.C. 154(b) by 185 days.

(21) Appl. No.: 14/059,590

(22) Filed: Oct. 22, 2013

(65) Prior Publication Data

US 2014/0114968 A1    Apr. 24, 2014

Related U.S. Application Data

(63) Continuation of application No. 13/958,057, filed on Aug. 2, 2013.

(60) Provisional application No. 61/716,766, filed on Oct. 22, 2012.

(51) Int. Cl.
*G06F 17/30* (2006.01)

(52) U.S. Cl.
CPC .......... *G06F 17/30* (2013.01); *G06F 17/30303* (2013.01); *G06F 17/30321* (2013.01)

(58) Field of Classification Search
CPC ............. G06F 17/30; G06F 17/30321; G06F 17/30303
USPC ........................................................ 707/687
See application file for complete search history.

(56) References Cited

U.S. PATENT DOCUMENTS

| | | | |
|---|---|---|---|
| 5,179,643 A | 1/1993 | Homma et al. |
| 5,742,806 A | 4/1998 | Reiner et al. |
| 5,842,200 A | 11/1998 | Agrawal et al. |
| 5,845,285 A | 12/1998 | Klein |

(Continued)

FOREIGN PATENT DOCUMENTS

| | | |
|---|---|---|
| EP | 1302871 | 4/2003 |
| JP | 03-002938 | 1/1991 |

(Continued)

OTHER PUBLICATIONS

Alur et al., "IBM WebSphere Information Analyzer and Data Quality Assessment," Dec. 1, 2007.

(Continued)

*Primary Examiner* — Jensen Hu
(74) *Attorney, Agent, or Firm* — Occhiuti & Rohlicek LLP

(57) ABSTRACT

Profiling data includes processing an accessed collection of records, including: generating, for a first set of distinct values appearing in a first set of one or more fields, corresponding location information; generating, for the first set of fields, a corresponding list of entries identifying a distinct value from the first set of distinct values and the location information for the distinct value; generating, for a second set of one or more fields, a corresponding list of entries, with each entry identifying a distinct value from a second set of distinct values appearing in the second set of fields; and generating result information, based at least in part on: locating at least one record of the collection using the location information for at least one value appearing in the first set of fields, and determining at least one value appearing in the second set of fields of the located record.

73 Claims, 13 Drawing Sheets

(56) References Cited

U.S. PATENT DOCUMENTS

| | | | |
|---|---|---|---|
| 5,966,072 | A | 10/1999 | Stanfill et al. |
| 6,134,560 | A | 10/2000 | Kliebhan |
| 6,138,123 | A | 10/2000 | Rathbun |
| 6,163,774 | A | 12/2000 | Lore et al. |
| 6,343,294 | B1 | 1/2002 | Hawley |
| 6,553,366 | B1 | 4/2003 | Miller et al. |
| 6,601,048 | B1 | 7/2003 | Gavan et al. |
| 6,657,568 | B1 | 12/2003 | Coelho et al. |
| 6,741,995 | B1 | 5/2004 | Chen et al. |
| 6,788,302 | B1 | 9/2004 | Ditlow et al. |
| 6,801,938 | B1 | 10/2004 | Bookman et al. |
| 6,959,300 | B1 | 10/2005 | Caldwell et al. |
| 7,013,290 | B2 | 3/2006 | Ananian |
| 7,047,230 | B2 | 5/2006 | Gibbons |
| 7,058,819 | B2 | 6/2006 | Okaue |
| 7,117,222 | B2 | 10/2006 | Santosuosso |
| 7,376,656 | B2 | 5/2008 | Blakeley et al. |
| 7,403,942 | B1 | 7/2008 | Bayliss |
| 7,433,861 | B2 | 10/2008 | Santosuosso |
| 7,698,163 | B2 | 4/2010 | Reed et al. |
| 7,756,873 | B2 | 7/2010 | Gould et al. |
| 7,813,937 | B1 | 10/2010 | Pathria et al. |
| 7,849,075 | B2 | 12/2010 | Gould et al. |
| 8,296,274 | B2 | 10/2012 | Leppard |
| 2002/0120602 | A1 | 8/2002 | Overbeek et al. |
| 2002/0161778 | A1 | 10/2002 | Linstedt |
| 2002/0198877 | A1 | 12/2002 | Wolff et al. |
| 2003/0023868 | A1 | 1/2003 | Parent |
| 2003/0033138 | A1 | 2/2003 | Bangalore et al. |
| 2003/0140027 | A1 | 7/2003 | Huttel et al. |
| 2004/0023666 | A1 | 2/2004 | Moon et al. |
| 2004/0049492 | A1 | 3/2004 | Gibbons |
| 2004/0083199 | A1 | 4/2004 | Govindugari et al. |
| 2004/0111410 | A1 | 6/2004 | Burgoon et al. |
| 2004/0181514 | A1 | 9/2004 | Santosuosso |
| 2004/0181533 | A1 | 9/2004 | Santosuosso |
| 2004/0249810 | A1 | 12/2004 | Das et al. |
| 2004/0260711 | A1 | 12/2004 | Chessell et al. |
| 2005/0055369 | A1 | 3/2005 | Gorelik et al. |
| 2005/0065914 | A1 | 3/2005 | Chang et al. |
| 2005/0071320 | A1 | 3/2005 | Chkodrov et al. |
| 2005/0102325 | A1* | 5/2005 | Gould et al. ............... 707/104.1 |
| 2005/0114368 | A1 | 5/2005 | Gould et al. |
| 2005/0114369 | A1 | 5/2005 | Gould et al. |
| 2005/0177578 | A1 | 8/2005 | Chen et al. |
| 2005/0192994 | A1 | 9/2005 | Caldwell et al. |
| 2006/0041544 | A1 | 2/2006 | Santosuosso |
| 2006/0294055 | A1 | 12/2006 | Santosuosso |
| 2006/0294129 | A1* | 12/2006 | Stanfill et al. ................ 707/102 |
| 2007/0050381 | A1 | 3/2007 | Hu et al. |
| 2007/0073721 | A1 | 3/2007 | Belyy et al. |
| 2007/0288490 | A1 | 12/2007 | Longshaw |
| 2007/0299832 | A1 | 12/2007 | Chang et al. |
| 2008/0215602 | A1 | 9/2008 | Samson et al. |
| 2008/0222089 | A1 | 9/2008 | Stewart et al. |
| 2008/0306920 | A1 | 12/2008 | Santosuosso |
| 2009/0216717 | A1 | 8/2009 | Suereth et al. |
| 2010/0250563 | A1 | 9/2010 | Cao et al. |
| 2011/0066602 | A1 | 3/2011 | Studer et al. |
| 2011/0153667 | A1 | 6/2011 | Parmeter et al. |
| 2011/0225191 | A1 | 9/2011 | Xie |
| 2012/0197887 | A1 | 8/2012 | Anderson |
| 2012/0323927 | A1 | 12/2012 | Froemmgen |
| 2013/0166576 | A1 | 6/2013 | Hudzia et al. |
| 2014/0115013 | A1* | 4/2014 | Anderson .................... 707/812 |

FOREIGN PATENT DOCUMENTS

| | | |
|---|---|---|
| JP | H07-502617 | 3/1995 |
| JP | 08-030637 | 2/1996 |
| JP | 10-055367 | 2/1998 |
| JP | 10-091633 | 4/1998 |
| JP | 10-320423 | 12/1998 |
| JP | 11-238065 | 8/1999 |
| JP | 2001-43237 | 2/2001 |
| JP | 2002-024262 | 1/2002 |
| WO | WO 00/57312 | 9/2000 |
| WO | WO 00/79415 | 12/2000 |
| WO | WO 03/071450 | 8/2003 |
| WO | WO2005029369 | 3/2005 |

OTHER PUBLICATIONS

Kandel et al., "Profiler: Integrated Statistical Analysis and Visualization for Data Quality Assessment," AVI '12 Proceedings of the International Working Conference on Advanced Visual Interfaces, May 21, 2012.

Apte, Chidanand, et al., "Business Application for Data Mining," Aug. 2002, Communications of the ACM, vol. 45, No. 8, pp. 49-53.

"Ascential" http://www.ascentialsoftware.com (2003).

"Avellino" http://www.avellino.com (2003).

Bagchi et al.. "Dependency Interference Algorithms for Relational Database Design." *Computers in Industry* 14 (1990) 319-350.

Bell et al. "Discovery of Data Dependencies in Relational Databases" *Research Reports of the Unit No. VIII (AI)*, Computer Science Department of Dortmund, DE, Apr. 1995, pp. 1-18.

Bell et al.. "Discovery of Data Dependencies in Relational Databases." LS-8 Report 14, Dortmund, Apr. 3, 1995 1-18.

Bitton et al.. "A Feasibility and Performance Study of Dependency Inference." Department of Electrical Engineering and Computer Science, University of Illinois at Chicago (1989) 635-641.

Brown et al. . "BHUNT: Automatic Discovery of Fuzzy Algebraic Constraints in Relational Data." 29$^{th}$ VLDB Conference, Sep. 9, 2003, XP-002333907.

Bruno et al.. "Efficient Creation of Statistics over Query Expressions." The Computer Society (2003) 201-212.

Chaudhuri, S., "An Overview of Query Optimization in Relational Systems", XP-000782631, pp. 34-43 (1998).

Dasu et al. "Mining Database Structure; Or, How to Build a Data Quality Browser." ACM SIGMOD 2002 Conference, Jun. 4, 2002, XP-002333902, 240-251.

"Evoke", http://www.evokesoftware.com, (2003).

USPTO Non-Final Office Action issued for U.S. Appl. No. 10/941,401, mailed Jul. 21, 2009, 32 pages.

Examination Report in Canadian Application No. 2,655,735 dated May 4, 2009, 2 pages.

Examination Report in Canadian Application No. 2,655,731 dated Dec. 3, 2009, 3 pages.

Examiner's Report in Australian Application No. 2009200294, dated Jun. 12, 2012, 3 pages.

Florescu, Daniela et al., "A Performance Evaluation of Alternative Mapping Schemes for Storing XML Data in a Relational Database," May 1999, http://www.caravel.inria.fr/Fmbrepubs_dana.html, 31 pages.

Graefe, Goetz. "Query Evaluation Techniques for Large Databases." ACM Computing Surveys, vol. 25, No. 2, Jun. 1993, 98 pages.

Henrard et al.. "Data Dependency Elicitation in Database Reverse Engineering." Institut d'Informattique, University of Namur, Belgium, (2001), 11-19.

Huhtala, Y. et al., "Efficient Discovery of Functional and Approximate Dependencies Using Partitions (Extended Version)," University of Helsinki, Department of Computer Science Series of Publications C, Report C-1997-79, Nov. 1997.

Huhtala, Y. et al., "Efficient Discovery of Functional and Approximate Dependencies Using Paritions," Proceedings of the 14$^{th}$ International Conference on Data Engineering, Feb. 23-27, 1998, pp. 392-401.

Huhtala et al., "TANE: An Efficient Algorithm for Discovering Functional and Approximate Dependencies", The Computer Journal, vol. 42, No. 2 (1999).

IBM "Profiling: Take the First Step Toward Assuring Data Quality," white paper, GC-18-9728-00, Dec. 2005.

International Search Report & Written Opinion, PCT/US2012/022905, May 2, 2012, 12 pages.

Jaedicke, et al., On Parallel Processing of Aggregate and Scalar Functions in Object-Relational DBMS, XP-002313223, pp. 379-389 (1998).

(56) References Cited

OTHER PUBLICATIONS

Jahnke et al.. "Adaptive Tool Support for Database Reverse Engineering." AG-Softwaretechnik, Universität Paderborn, Germany (19990, 278-282.
Johnson, T et al., "Comparing Massive High-Dimensional Data Sets," Proceedings of the 4th International Conference on Knowledge Discovery and Data Mining (KDD 98), Aug. 27-31, 1998, pp. 229-233.
Kivinen, J and H. Mannila, "Approximate Inference of Functional Dependencies from Relations," Theoretical Computer Science, vol. 149, 1995, pp. 129-149.
Lee, Kyong-Ha et al., "Bitmap Indexes for Relational XML Twig Query Processing," OIKM '09, Nov. 2-6, 2009, 10 pages.
Lemire et al. "Sorting Improves Word-Aligned Bitmap Indexes" *Data & Knowledge Engineering,* Dec. 2009, pp. 1-43.
Li et al., "A Practical External Sort for Shared Disk MPPs", http://www.thearling.com/text/sc93/sc93.
Lopes, S. et al., "Efficient Discovery of Functional Dependencies and Armstrong Relations," Proceedings of the 7th International Conference on Extending Database Technology (EDBT 2000), LNCS 1777, Mar. 27-31, 2000, pp. 350-364.
Mannila, Heikki, "Theoretical Frameworks for Data Mining," Jan. 2000, SIGKDD Explorations, vol. 1, No. 2, pp. 30-32.
Milne, Robert et al., "Predicting Paper Making Defects On-line Using Data Mining," Jul. 24, 1998, Knowledge-Based Systems, vol. 11, pp. 331-338.
Munakata, Koichi, "Integration of Distributed Heterogeneous Information Sources," with English Translation. Systems, Control and Information, Japan, The Institute of Systems, Control and Information Engineers, Dec. 15, 1996, vol. 40, No. 12, pp. 514-521.
Notification of Reason(s) for Refusal in Japanese Patent Application No. 2006-526986, mailed Oct. 13, 2010, 3 pages.
Novelli, N. et al., "FUN: An Efficient Algorithm for Mining Functional and Embedded Dependencies," Proceedings of the 8th International Conference on Database Theory (ICDT 2001), LNCS 1973, Jan. 4-6, 2001, pp. 189-203.
Office Action issued in Japanese Application No. 2010-153799, English Translation included, mailed May 8, 2012, 6 pages.
Office Action issued in Japanese Application No. 2010-153800, English Translation included, mailed May 8, 2012, 5 pages.
Olson, "Know Your Data: Data Profiling Solutions for Today's Hot Projects", XP-002313222, p. 1-4, published in DM Review, printed from DMReview.com (Mar. 2000).
Petit et al.. "Towards the Reverse Engineering of Denormalizes Relational Databases." Laboratoire d'Ingénierie des Systèmes d'Information, Lyon (1996), 218-227.
Rahm, et al., "Data Cleaning: Problems and Current Approaches", XP-002284896 (2000).
Summons to attend oral proceedings pursuant to Rule 115(a) EPC in EP application No. 04784113.5, dated Jul. 30, 2010, 8 pages.
Wyss et al.. "FastFDs: A Heuristic-Driven, Depth-First Algorithm for Mining Functional Dependencies from Relation Instances." (Extended Abstract) Computer Science Department, Indiana University XP-002333906 101-110.
Yan, Men in, et al., "Algorithm for discovering multivalued dependencies," 2001, ACM Proceedings of the 10th International Conference on Information and Knowledge Management, pp. 556-558.
Yao, H. et al., "FD_Mine: Discovering Functional Dependencies in a Database Using Equivalences," University of Regina, Department of Computer Science, Technical Report TR 2002-04, Aug. 2002.
Yao, H. et al., "FD_Mine: Discovering Functional Dependencies in a Database Using Equivalencies," Proceedings of the 2nd IEEE International Conference on Data Mining, Dec. 9-12, 2002, pp. 729-732.
Yao, Hong et al., "Mining functional dependencies from data," Sep. 15, 2007, Springer Science-Business Media, Data Mining and Knowledge Discovery, vol. 16, No. 2, pp. 197-219.
Yoon, Jong P., et al., "BitCube: A Three-Dimensional Bitmap Indexing for XML Documents," Journal of Intelligent Information Systems, 2001, 17:2/3, pp. 241-254.
Office Action issued in Japanese Application No. 2006-526986, English Translation included, mailed Nov. 22, 2012, 61 pages.
Japanese Office Action, application No. 2010-153799, mailed Feb. 12, 2013, 4 pages.
U.S. Appl. No. 10/941,402, filed Sep. 15, 2004.
U.S. Appl. No. 10/941,373, filed Sep. 15, 2004.
U.S. Appl. No. 10/941,401, filed Sep. 15, 2004.
U.S. Appl. No. 13/827,558, filed Mar. 14, 2013.
U.S. Appl. No. 13/360,230, filed Jan. 27, 2012.
U.S. Appl. No. 13/958,057, filed Aug. 2, 2013.
U.S. Appl. No. 14/059,641, filed Aug. 2, 2013.
U.S. Appl. No. 13/957,664, filed Aug. 2, 2013.
Naumann, Felix "Data Profiling Revisited," SIGMOD Record, vol. 42, No. 4, pp. 40-49 (2014).
Lynch, C. "Canonicalization: a fundamental tool to facilitate preservation and management of digital information," D-Lib Magazine, vol. 5, No. 9, pp. 1-6 (1999).
Bell et al., "Discovery of Data Dependencies in Relational Databases," University of Dortmund, LS-8, Report 14, Apr. 3, 1995.
DataFlux Corporation, "Data Profiling. The Foundation for Data Management," Jul. 2004.
Kouris et al., "Using Information Retrieval Techniques for Supporting Data Mining," Data & Knowledge Engineering 52 (2005) 353-383.
English Translation of Notification of Reasons for Refusal, Japanese Application No. 2013-551372, mailed Oct. 27, 2015 (3 pages).

\* cited by examiner

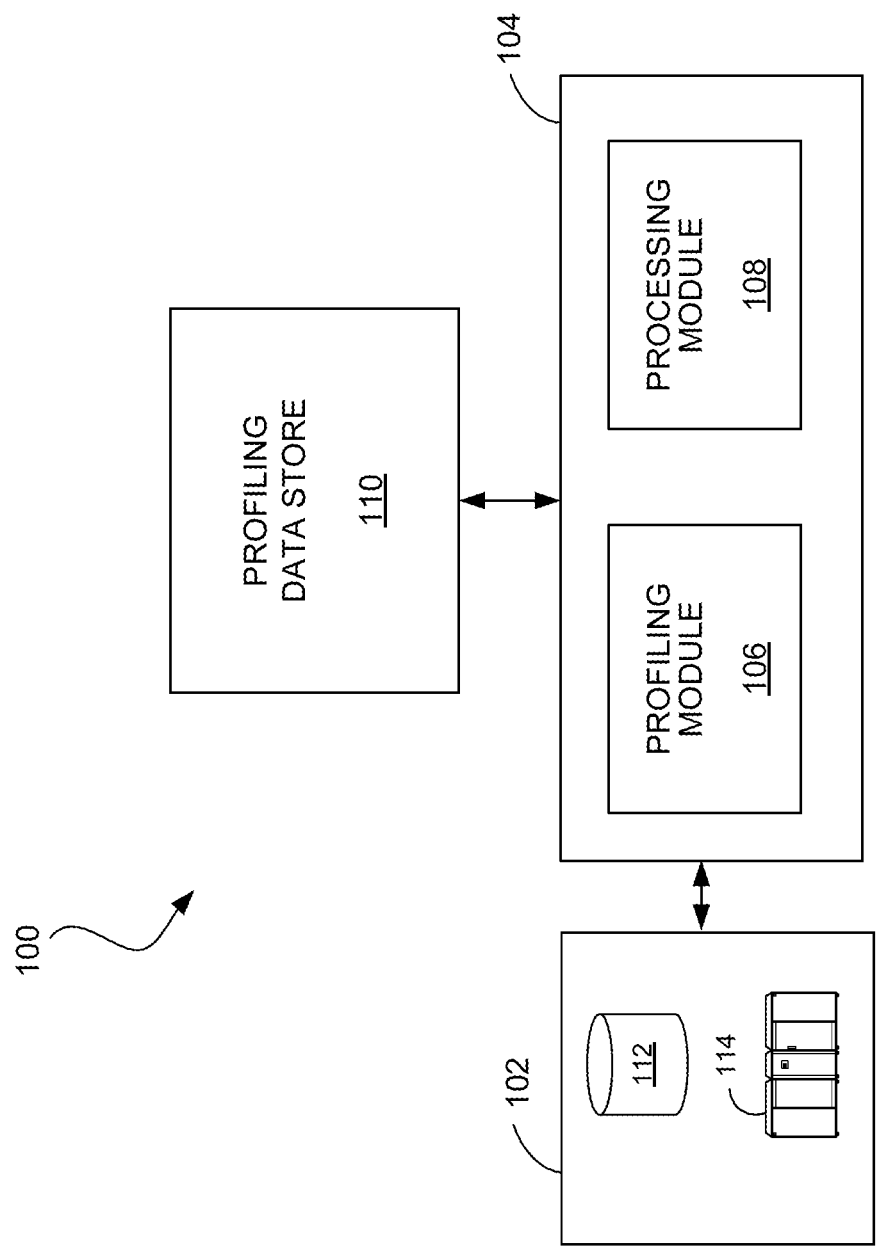

PROFILING DATA WITH LOCATION INFORMATION

CROSS-REFERENCE TO RELATED APPLICATIONS

This application is a continuation of and claims priority to U.S. application Ser. No. 13/958,057, filed on Aug. 2, 2013, which claims priority to U.S. Application Ser. No. 61/716,766, filed on Oct. 22, 2012, each of which is incorporated herein by reference.

BACKGROUND

This description relates to profiling data with location information.

Stored datasets often include data for which various characteristics are not known. The data in a dataset may be organized as records that have values for respective fields (also called "attributes" or "columns"). The values in a field may include strings, numbers, or any data, including possibly null values, encoded and formatted according to associated data format information for the field. In some cases the data format information for a field is known, but the actual values appearing in the field may not be known. For example, ranges of values or typical values for fields over the records within a dataset, relationships between different fields of the records within the dataset, or dependencies among values in different fields, may be unknown. Data profiling can involve examining a source of a dataset in order to determine such characteristics.

SUMMARY

In one aspect, in general, a method for profiling data stored in at least one data storage system includes: accessing at least one collection of records stored in the data storage system over an interface coupled to the data storage system; and processing the collection of records to generate result information characterizing values appearing in one or more specified fields of the collection of records. The processing includes: generating, for a first set of distinct values appearing in a first set of one or more fields of the records in the collection, corresponding location information that identifies, for each distinct value in the first set of distinct values, every record in which the distinct value appears; generating, for the first set of one or more fields, a corresponding list of entries, with each entry identifying a distinct value from the first set of distinct values, and the location information for the distinct value; generating, for a second set of one or more fields of the records in the collection different from the first set of one or more fields, a corresponding list of entries, with each entry identifying a distinct value from a second set of distinct values appearing in the second set of one or more fields; and generating the result information characterizing values appearing in the one or more specified fields of the collection of records, based at least in part on: locating at least one record of the collection of records using the location information for at least one value appearing in the first set of one or more fields, and determining at least one value appearing in the second set of one or more fields of the located record.

Aspects can include one or more of the following features.

Each entry further identifies a count of the number of records in which a distinct value appears in a set of one or more fields.

The processing further includes sorting the entries in each list by the identified count.

The processing further includes: generating, for the second set of distinct values, corresponding location information that identifies, for each distinct value in the second set of distinct values, every record in which the distinct value appears, wherein, for the list corresponding to the second set of one or more fields, each entry identifying a distinct value from the second set of distinct values includes the location information for the distinct value.

The processing further includes generating, for a set of distinct pairs of values, with a first value in each pair appearing in the first set of one or more fields of the records and a second value in each pair appearing in the second set of one or more fields of the records, corresponding location information that identifies, for each distinct pair of values, every record in which the distinct pair of values appears.

Generating location information for a distinct pair of values from the set of distinct pairs of values includes determining an intersection between location information for a first distinct value from the first set of distinct values and location information for a second distinct value from the second set of distinct values.

Determining the intersection includes using the location information for the first distinct value to locate a record in the collection, and using the located record to determine the second distinct value.

The method further includes sorting a group of multiple lists, including the list corresponding to the first set of one or more fields and the list corresponding to the second set of one or more fields, by the number of distinct values identified in the entries in each list.

The processing further includes: generating, for a set of distinct pairs of values, with a first value in each pair appearing in the first set of one or more fields of the records and a second value in each pair appearing in a second set of one or more fields of the records different from the first set of one or more fields, corresponding location information that identifies, for each distinct pair of values, every record in which the distinct pair of values appears; and generating, for the set of distinct pairs of values, a corresponding list of entries, with each entry identifying a distinct pair of values from the set of distinct pairs of values, and the location information for the distinct pair of values.

The location information identifies a unique index value for every record in which the distinct value appears.

The location information identifies a particular unique index value by storing that particular unique index value.

The location information identifies a unique index value by encoding the unique index value within the location information.

Encoding the unique index value includes storing a bit at a position within a vector corresponding to the unique index value.

The collection includes a first subset of records with fields including the first set of one or more fields, and a second subset of records with fields including the second set of one or more fields.

The processing further includes generating information that provides a mapping between: (1) index values of a field of the first subset of records that associates a unique index value with every record in the first subset, and (2) key values of a field of the second subset of records that associates a key value with every record in the second subset of values; wherein the key value links records in the second subset with records in the first subset.

The location information identifies the unique index values for every record in which the distinct value appears.

In another aspect, in general, a computer program is stored on a computer-readable storage medium, for profiling data stored in at least one data storage system. The computer program includes instructions for causing a computing system to: access at least one collection of records stored in the data storage system over an interface coupled to the data storage system; and process the collection of records to generate result information characterizing values appearing in one or more specified fields of the collection of records. The processing includes: generating, for a first set of distinct values appearing in a first set of one or more fields of the records in the collection, corresponding location information that identifies, for each distinct value in the first set of distinct values, every record in which the distinct value appears; generating, for the first set of one or more fields, a corresponding list of entries, with each entry identifying a distinct value from the first set of distinct values, and the location information for the distinct value; generating, for a second set of one or more fields of the records in the collection different from the first set of one or more fields, a corresponding list of entries, with each entry identifying a distinct value from a second set of distinct values appearing in the second set of one or more fields; and generating the result information characterizing values appearing in the one or more specified fields of the collection of records, based at least in part on: locating at least one record of the collection of records using the location information for at least one value appearing in the first set of one or more fields, and determining at least one value appearing in the second set of one or more fields of the located record.

In another aspect, in general, a computing system for profiling data stored in at least one data storage system includes: an interface coupled to the data storage system configured to access at least one collection of records stored in the data storage system; and at least one processor configured to process the collection of records to generate result information characterizing values appearing in one or more specified fields of the collection of records. The processing includes: generating, for a first set of distinct values appearing in a first set of one or more fields of the records in the collection, corresponding location information that identifies, for each distinct value in the first set of distinct values, every record in which the distinct value appears; generating, for the first set of one or more fields, a corresponding list of entries, with each entry identifying a distinct value from the first set of distinct values, and the location information for the distinct value; generating, for a second set of one or more fields of the records in the collection different from the first set of one or more fields, a corresponding list of entries, with each entry identifying a distinct value from a second set of distinct values appearing in the second set of one or more fields; and generating the result information characterizing values appearing in the one or more specified fields of the collection of records, based at least in part on: locating at least one record of the collection of records using the location information for at least one value appearing in the first set of one or more fields, and determining at least one value appearing in the second set of one or more fields of the located record.

In another aspect, in general, a computing system for profiling data stored in at least one data storage system includes: means for accessing at least one collection of records stored in the data storage system; and means for processing the collection of records to generate result information characterizing values appearing in one or more specified fields of the collection of records. The processing includes: generating, for a first set of distinct values appearing in a first set of one or more fields of the records in the collection, corresponding location information that identifies, for each distinct value in the first set of distinct values, every record in which the distinct value appears; generating, for the first set of one or more fields, a corresponding list of entries, with each entry identifying a distinct value from the first set of distinct values, and the location information for the distinct value; generating, for a second set of one or more fields of the records in the collection different from the first set of one or more fields, a corresponding list of entries, with each entry identifying a distinct value from a second set of distinct values appearing in the second set of one or more fields; and generating the result information characterizing values appearing in the one or more specified fields of the collection of records, based at least in part on: locating at least one record of the collection of records using the location information for at least one value appearing in the first set of one or more fields, and determining at least one value appearing in the second set of one or more fields of the located record.

In another aspect, in general, a method, computer-readable medium, and system for profiling data stored in at least one data storage system includes: accessing at least one collection of records stored in the data storage system over an interface coupled to the data storage system; and processing the collection of records to generate result information characterizing values appearing in one or more specified fields of the collection of records. The processing includes: generating, for a first set of two or more fields, a corresponding list of entries, with each entry identifying a distinct combination of values appearing in a first set of two or more fields of the records in the collection, and profile information for the distinct combination of values; and generating the result information characterizing values appearing in the one or more specified fields of the collection of records, based at least in part on: combining the profile information from the list of entries for at least two distinct combinations of values appearing in the first set of two or more fields, and determining profile information for at least one value appearing in at least one of the one or more specified fields based on the combined profile information.

Aspects can include one or more of the following advantages.

Some data profiling procedures compute measures of the data quality of a dataset by compiling a census of the distinct values in a domain of the records of the dataset, where a "domain" consists of one or more fields, combinations of fields, or fragments of fields of the records of that dataset. When a census is compiled for a domain, census data is stored that enumerates the set of distinct values for that domain and includes counts of the number of records having each distinct value. For example, the census data can be arranged as a list of value count entries for a selected domain, with each value count entry including a distinct value appearing in the selected domain and a count of the number of records in which that distinct value appears in the selected domain. In some implementations, each field is a separate domain. In some implementations, the census data is stored in a single dataset, optionally indexed by field for fast random access, while in other implementations, the census data may be stored in multiple datasets, for example, one for each field.

Measures of data quality may include the number and distribution of distinct values, the number and distribution of valid or invalid values according to specified validation rules, the number and distribution of values in one set of one or more fields when the values in another set of one or more fields are held fixed (also called "segmentation"), and the correlation (also called "functional dependency") between values in two or more fields. Each time a particular measure is to be computed, a suitable census may be taken by processing the data in the dataset. However, in some cases such as when computing a data quality measure for a combination of fields, instead of requiring the full volume of data be processed again, computations for that combination of fields may be performed using stored census data already computed for the individual fields.

In some implementations, the census data for a selected domain includes location information that identifies, for each distinct value in the census data, every record in which that distinct value appears in the selected domain. The location information need only be computed once over the full volume of data. Subsequent evaluation of data quality measures involving combinations of fields, in particular, measures involving segmentation, correlation, or validation rules incorporating multiple fields, may be computed directly from the existing census data with location information without returning to the source storing the records of the dataset to compute new census data. This makes the computation of additional data quality measures much more efficient. In addition, the census data with location information can be used to drill down into data quality results, that is, to return the underlying data records associated with a data quality result, for example, invalid records or duplicate records in a primary key field. If domains of different datasets are being profiled, an index map can be used to avoid need to perform a join operation in order to relate records of the different datasets.

Other features and advantages of the invention will become apparent from the following description, and from the claims.

DESCRIPTION OF DRAWINGS

FIG. 1 is a block diagram of a system for profiling data.

DESCRIPTION

Figure 2A:
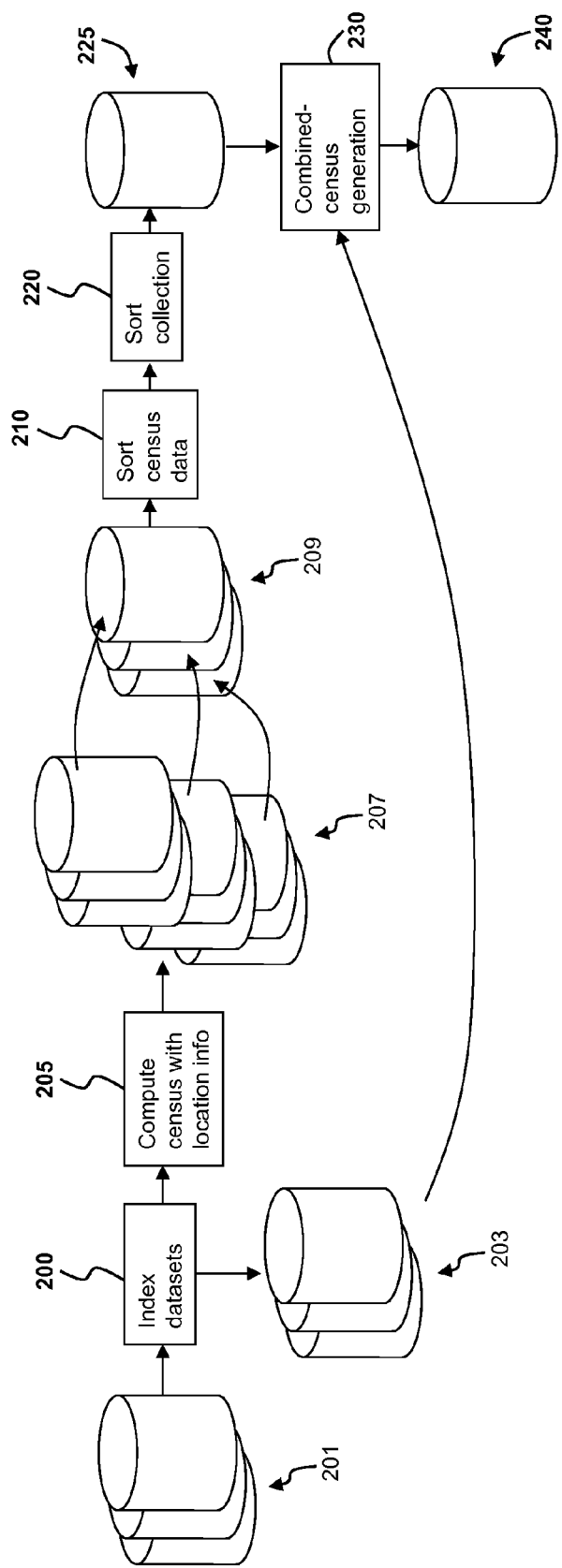
FIG. 2A is a schematic diagram of operations and data for a data profiling procedure.

FIG. 1 shows an exemplary data processing system 100 in which the data profiling techniques can be used. The system 100 includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 includes a profiling module 106 and processing module 108. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The profiling module 106 reads data from the data source 102 and stores profiling summary information in a profiling data store 110 that is accessible to the profiling module 106 and to the processing module 108. For example, the profiling data store 110 can be maintained within a storage device of the data source 102, or in a separate data storage system accessible from within the execution environment 104. Based on the profiling summary information, the processing module 108 is able to perform various processing tasks on the data in the data source 102, including cleansing the data, loading the data into another system, or managing access to objects stored in the data source 102. Storage devices providing the data source 102 may be local to the execution environment 104, for example, being stored on a storage medium connected to a computer running the execution environment 104 (e.g., hard drive 112), or may be remote to the execution environment 104, for example, being hosted on a remote system (e.g., mainframe 114) in communication with a computer running the execution environment 104, over a remote connection or service (e.g., provided by a cloud computing infrastructure).

The profiling module 106 is able to read data stored in the data source 102 and perform various kinds of analysis in an efficient manner, including analysis useful for computing data quality measures based on functional dependency or segmentation, for example. In some implementations, the analysis includes generating census data for each individual field of the records of a dataset stored in the data source 102, and storing that census data in the profiling data store 110. As described above, the census data for a particular domain of the records in a particular dataset, which includes an entry for each distinct value appearing in the domain, can also include location information identifying respective locations (e.g., in terms of record index values) of records within the particular dataset in which the distinct values appear. In one implementation, during generation of the census entry for an associated value, a vector is populated with unique record identifiers of every record having the associated value. If the records in the original data of the dataset do not have unique record identifiers, such record identifiers can be generated and added to the records as part of the profiling procedures, for example, by assigning a sequence of consecutive numbers to each record. This location information can then be included within the census entries, and can be used in the generation of additional combined census data for computations for functional dependency or segmentation, as described in more detail below.

Other implementations for storing location information are possible, some of which may offer advantages in performance and/or reduced storage space. For example, a bit vector may be used instead of a vector of record identifiers. Each bit of the bit vector corresponds to a particular record identifier, and a bit is set if the associated record having the corresponding record identifier has the associated value. The correspondence between bits of the bit vector and record identifier may be explicit or implicit. For example, there may be an explicit mapping, not necessarily one-to-one, which associates bits to corresponding record identifiers, or there may be an implicit mapping where the position of each bit corresponds to a sequential ordering of record locations. In some implementations, the resulting bit vector is compressed for further savings in storage.

The location information may also be stored in a vector of bit vectors. For example, each bit in a bit vector corresponds to an associated record identifier, possibly through a mapping between bit position and record identifier stored in a cross-referenced file. The vector-index of a bit vector entry in a vector of bit vectors may be used to implicitly encode supplementary information such as the number of words in a field or the data partition in which the value occurs (e.g., when processing the census data in parallel in multiple data partitions). Explicit supplementary information may be specified in additional fields associated with a bit vector, or associated with a bit vector entry in a vector of bit vectors. This supplementary information may be used to distinguish sets of records containing the value for later use.

Figure 2B:
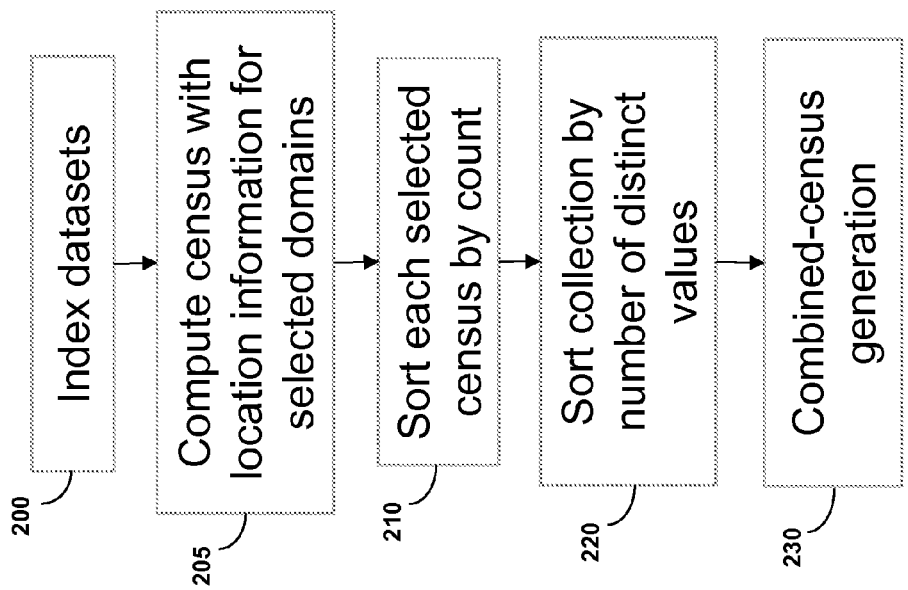
FIG. 2B is a flowchart for the data profiling procedure.

FIG. 2A illustrates an example of the operations performed during a data profiling procedure, and data received and generated during the procedure, as performed by the profiling module 106 on one or more datasets from the data source 102. FIG. 2B is a flowchart for the procedure. Referring to FIGS. 2A and 2B, the profiling module 106 performs an indexing operation 200 to ensure that each of the datasets 201 that will be profiled has an index value for each of the records in each dataset, which provides a well-defined location for each record that can be referenced by the location information that will be generated. For example, the index values for a particular dataset may be an incrementing integer (e.g., starting at 1 and incrementing by 1) assigned to each record based on its table row number, position within a delimited file, storage address, primary key value, or any other unique attribute of the record. The assigned index value may be explicitly added to each record to provide indexed datasets 203, for example, by adding the value as a field for each record within the original datasets in the data source 102, or stored as new datasets in the data source 102 or in the profiling data store 110. For cases in which an original dataset already includes a field that can be used as an index, the indexing operation 200 may be skipped or performed only to verify the ability to use that field as an index. The indexing operation 200 may include generating an index map that provides a correspondence between indexes for one dataset and indexes of another dataset, as described in more detail below.

The profiling module 106 performs a census operation 205 that computes census data with location information for each of a selected set of domains. In this example, each domain is a single field. So, in this example, the results of the census operation 205 are multiple sets of census data 207, each for a particular field of a particular dataset. Each dataset may have a set of fields that have been designated for profiling, or by default all fields of each dataset may be profiled. In other examples, a domain may be a fragment of a field, or a combination of multiple fields or fragments of fields. Each set of census data for a particular domain (also called a "census") contains a list of entries that include the distinct values occurring within the domain, a count of the number of records in which a particular value occurred, and associated location information identifying in which records a particular value occurred. In some implementations, the count is not included in a census explicitly, since it may be derivable when needed from the location information (e.g., the sum of the bits in a bit vector locating the records in which the value occurred would yield the number of records in which the value occurred). In some implementations, the profiling module 106 accumulates additional information to augment the location information, such as information that qualifies or characterizes the locations of the values within the domain.

The profiling module 106 receives an input (e.g., a user input) specifying a multi-domain data profiling result that is desired, which may be received potentially a long time after the sets of census data 207 have been generated. The input also specifies (explicitly or implicitly) multiple domains that are to be involved in the computation. In order to compute the multi-domain data profiling result, the profiling module 106 selects a collection 209 of censuses for the respective fields of the specified domains. One type of multi-domain data profiling result is a "combined census" that specifies the unique tuples of values that occur in respective fields of the same record (i.e., at the same index). Other types of multi-domain data profiling results include a functional dependency result or a segmentation result, each of which may start with a computation of a combined census, as described in more detail below.

Optionally, the profiling module 106 may sort the collection 209 so that the censuses, and the census entries within each census, are in an order that makes the computation of the current multi-domain data profiling result, or future multi-domain profiling results, more efficient. In this example, each census is sorted (210) so that entries occur in descending order by the count of occurrences, so the most common values appear first. Additionally, in some implementations, the entries may be sub-sorted by the location information, so that a value that first appears earlier in the dataset than another value with the same count of occurrences appears earlier in the sorted census. This gives a well-defined ordering to the census values since, for two different values, the first appearance (i.e., smallest record index) of one value must be different from the first appearance of the other value. The collection 209 of censuses are also sorted (220) by the number of distinct values in each census, and sub-sorted in descending order by the counts of the most common values. This sorting results in a sorted collection 225 of sorted censuses in which the shorter censuses (in number of distinct values) occur earlier, and for two censuses with the same number of distinct values, the one whose most common value has a larger count occurs earlier. For a multi-domain data profiling result that corresponds to functional dependency, it is more likely that there will be a functional dependence between fields with relatively low number of distinct values. As the number of distinct values increases, the field is more likely to represent a unique attribute such as a primary key, or an attribute with a low number of duplicate values, which would tend to be spuriously correlated to other values. By ordering the shorter censuses before longer ones, the fields that are more likely to be relevant to the functional dependency analysis will be processed sooner. In some cases, it may even be possible to recognize a halting condition where the result can be computed without continuing to process all of the entries of all of the censuses in the sorted collection 225. For multi-domain data profiling results other than functional dependency, it may be necessary to process the entire sorted collection 225 to compute the result, in which case sorting may not be necessary. In this example, the sorting 210 occurs before the sorting 220, but in other examples, the sorting 220 may occur before the sorting 210.

The profiling module 106 performs a combined-census generation operation 230 in which the census entries in the sorted collection 225 are read sequentially and combined with information from other census entries resulting in a combined census 240. To efficiently combine information from different census entries, the profiling module 106 uses the location information to locate records from the indexed datasets 203 that are relevant to the generation of the combined census 240, as described in more detail below. Multiple passes of the combined-census generation operation 230 may be performed. For example, if a tuple of the combined census 240 includes values from more than two fields, then when constructing a census entry in the combined census 240 for that tuple, the profiling module 106 may perform pairwise combination for two of the fields in the first pass, and in later passes census entries may be combined with any entries from a version of the combined census 240 previously formed.

Figure 3:
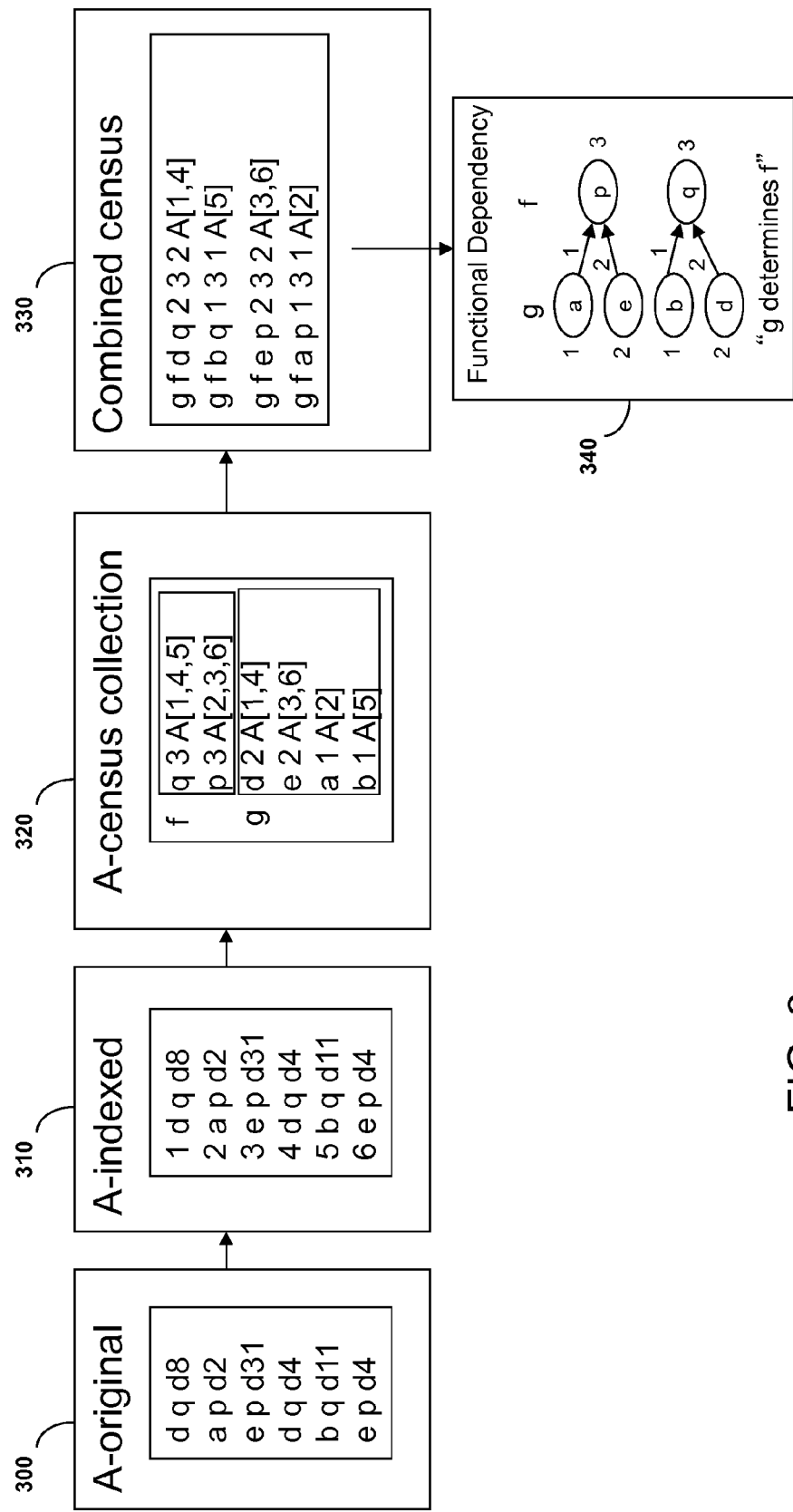
FIG. 3 is a schematic diagram of data generated for a functional dependency result.

Referring to FIG. 3, an example of the profiling procedure is illustrated. An A-original dataset 300 is indexed (in the indexing operation 200) to provide an A-indexed dataset 310. The A-original dataset 300 has three fields, which correspond to the three illustrated columns, and has six records, which correspond to the six illustrated rows, with the first record in the dataset having the values "d", "q", "d8", respectively, for the three fields. A surrogate key field with increasing integer values (starting from "1") has been added at the start of the records as a location index to uniquely identify each record in the A-indexed dataset 310. In this example, the profiling module 106 computes a sorted A-census collection 320 of censuses for the first two fields of the A-original dataset 300. The first field (i.e., the first column) is named "g", the second field (i.e., the second column) is named "f", and the name of the third field is not relevant in this example since it is not being profiled in this example. So, there are two censuses in the A-census collection, one for the g-field (called the "g-census") and one for the f-field (called the "f-census"). Each census in the A-census collection 320 includes a sorted list of entries, with each entry including a value, a count of the number of occurrences of that value, and a vector of record indexes representing the location information for that value. So, the first census entry in this example illustrated by the space-delimited string "q 3 A[1,4,5]" for the f-census indicates that the value "q" occurs 3 times in the A-original dataset 300 and appears in records 1, 4, and 5 of the A-indexed dataset 310 as indicated by the vector "A[1,4,5]". The census for each field is sorted in descending order by the count of values and sub-sorted in ascending order by the first index in the location information vector. The set of censuses in the A-census collection 320 is also sorted on the number of distinct values in each census, putting the shortest censuses first, which in this example places the census for the f-field before the census for the g-field.

The profiling module 106 performs the combined-census generation operation 230 to compute the combined census 330. In this example, a tuple in the combined census is a pair of values. The first entry in the combined census in this example illustrated by the space-delimited string "g f d q 2 3 2 A[1,4]" indicates that the first field of the pair is "g", the second field of the pair is "f", the first field value is "d", the value of the first field is "d", the value of the second field is "q", the first value occurs 2 times, the second value occurs three times, the number of records containing both the first value in the first field (i.e., a g-value of "d") and the second value in the second field (i.e., an f-value of "q") is 2, and these records in the A-indexed dataset 310 are 1 and 4 as indicated by the vector "A[1,4]". The combined census 330 can then be used to compute various data profiling analysis results, as described in more detail below.

In some implementations, a result based on a combined census may be displayed graphically in a user interface, such as a functional dependency result 340 for the example described above. Each circle contains a distinct value under the labels for the fields "g" and "f", and the count of that value is shown alongside the circle (to the left for the g-field, and to the right for the f-field). Each directed edge between circles indicates a pairing of the values at each end and the count above the edge is the number of records sharing the pair. From the various counts, an assessment of the correlation of individual values and of the pair of fields may be determined and displayed by the profiling module 106. In this example, the profiling module 106 displays the assessment that "g determines f."

In some implementations, the combined census generation operation 230 is able to generate a combined census of distinct pairs of values appearing in two fields together (i.e., in the same record) without having to form a Cartesian product of the distinct values appearing in the individual censuses for the fields. Such a Cartesian product could be used to compute such a combined census, for example, by obtaining location information for all pairs of values formed from such a Cartesian product and computing the intersection of the associated location information to locate records that share both values. This process using the full Cartesian product may be inefficient, however, because many pairs may have no overlap in their location information. The flowchart of FIG. 4 and the schematic diagram of FIG. 5 illustrate a procedure that may be used in the combined census generation operation 230, which is able to efficiently identify and combine those pairs that do share an overlap in their location information and avoid pairs that do not. In this example, the location information will be illustrated and described as a vector of record indexes, but computations on the vectors can be performed using other representations of the location information. For example, for f-value location information "f-A[ ]" and g-value location information "g-A[ ]", the intersection of f-A[ ] and g-A[ ] can be performed, with both vectors represented as bit vectors, by performing a logical AND operation on the respective bit vectors.

Figure 4:
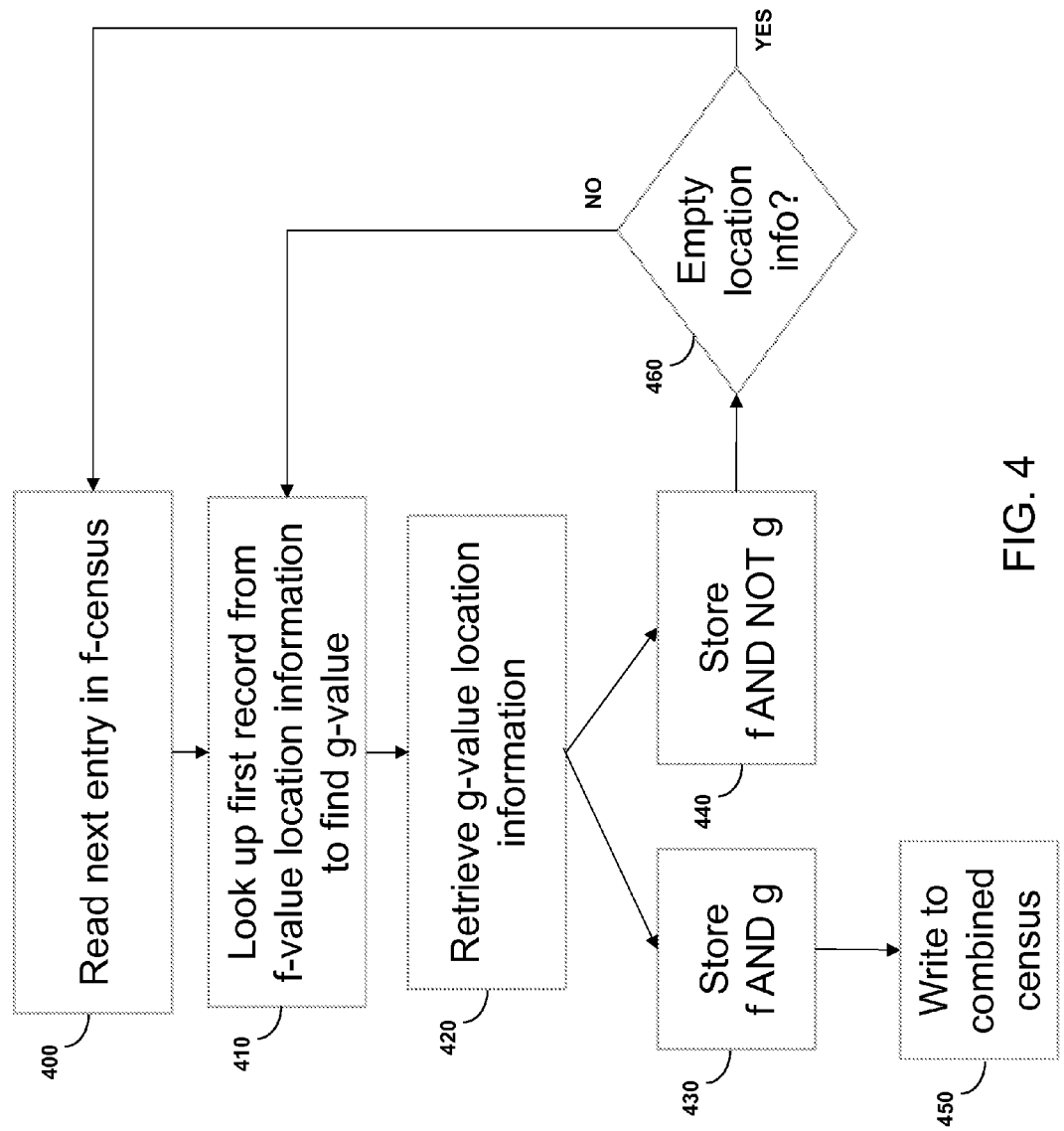
FIG. 4 is a flowchart of a procedure for combined census generation.
Figure 5:
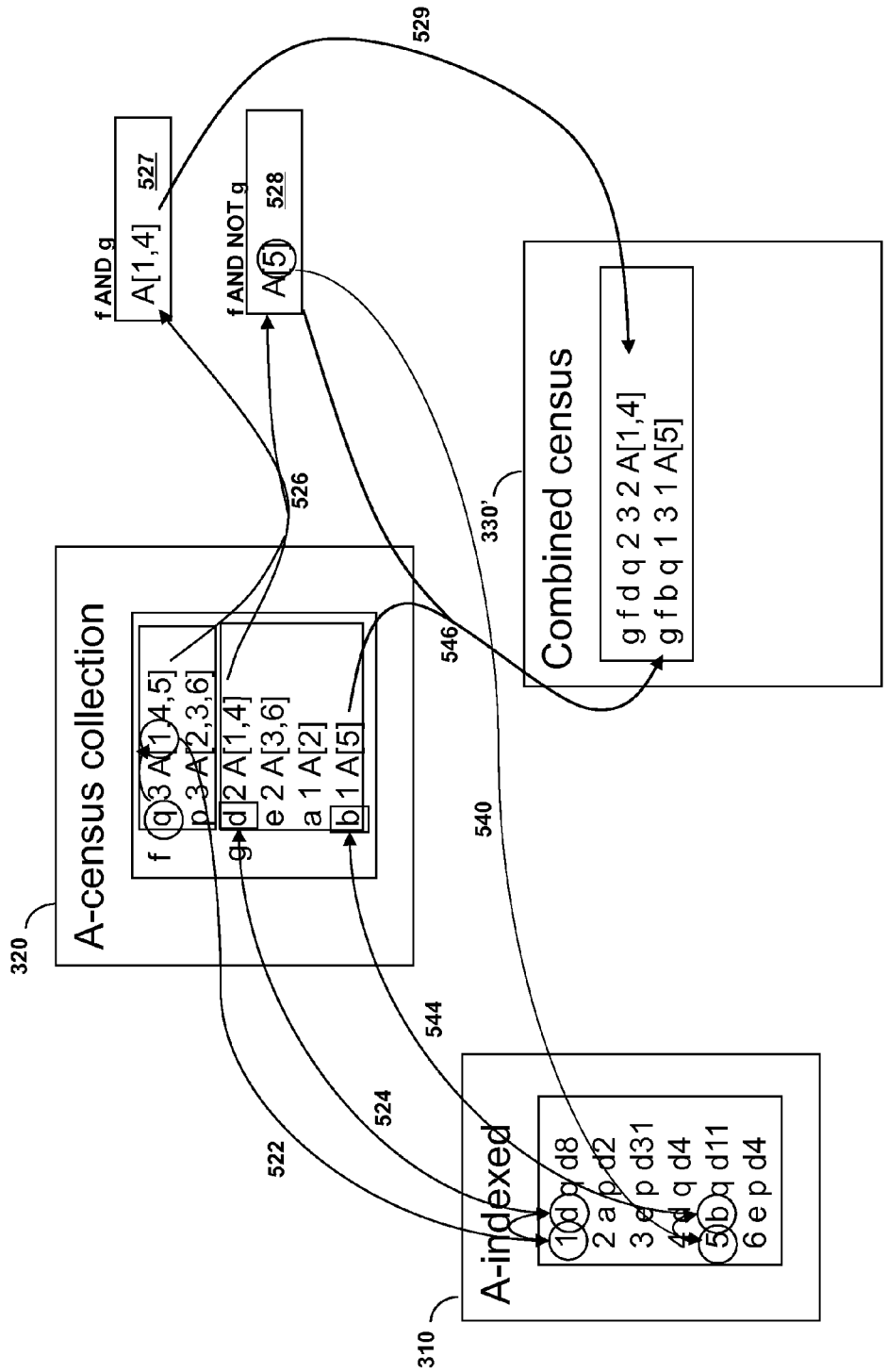
FIG. 5 is a schematic diagram of data for combined census generation.

The steps in the flowchart of FIG. 4 start after the A-census collection 320 has been prepared, as outlined above, for fields f and g with iteration over the sorted entries of the first census (the f-census in this example). The profiling module 106 reads (400) the next census entry (i.e., the first census entry for the first iteration) of the f-census. From the associated location information for the f-value in the current entry, the first record in which that value appears is looked up (410) in the A-indexed dataset 310 to find the paired g-value present in the g-field of that record. The profiling module 106 retrieves (420) the location information from the g-census associated with that g-value. The resulting g-value location information (g-A[ ]) is combined with the f-value location information (f-A[ ]) to store (430) information identifying all records that share the pair (f-A[ ] AND g-A[ ]) and to store (440) information updating the location information for the remaining set of records (f-A[ ]=f-A[ ] AND (NOT g-A[ ])) with the current f-value but a different g-value. The paired values are written (450) to the combined census 330. The location information for the remaining set is checked (460) to determine if it is empty. If it is not empty, the first record in the remaining set is looked up (410) to find another g-value paired with the current f-value from the A-indexed dataset 310. If the location information for the remaining set is empty, then the next census entry from the f-census is read (400) for performing another iteration. After all of the entries in the f-census have been read and processed in a complete iteration of the procedure, the combined census 330 will be complete.

FIG. 5 illustrates an example of the procedure of FIG. 4 with arrows showing a sequence of operations performed by the profiling module 106, up to a point at which there is a partially completed combined census 330'. The census entries in the f-census within the A-census collection 320 are considered in turn, starting with the first entry with the f-value "q", which based on the previous sorting is the most common f-value. The first element "1" in the location information vector is used to look up (522) the value of the g-field in the corresponding record in the A-indexed dataset 310. In this example, in the corresponding record (i.e., the record at index position 1), the g-field has the value "d". The g-census entry for the value "d" is looked up (524) to retrieve the full set of records sharing the value "d" as indicated by the location information vector. The location information vector for the f-value "q" is compared 526 with the location information for the g-value "d" to form location information for two sets of records: the set of records 527 having the pair of values "q" and "d" (g AND f) and the set of records 528 having the value "q" but not "d" (f AND NOT g). The location information for the shared values is stored (529) as a vector in the appropriate entry of the combined census 330'. In this example, an entry in the combined census consists of the source for each value, the values and their census counts, the location information for all records containing both values and the number of such records. The entry "g f d q 2 3 2 A[1,4]" indicates the g-value "d" occurs 2 times, the f-value "q" occurs 3 times, and there are 2 records sharing both values, which correspond to location indexes 1 and 4.

The profiling module 106 processes the remaining set of records 528 having the value "q". The first (and only) element "5" of the location information vector is used to look up (540) the value of the g-field in the corresponding record in the A-indexed dataset 310, which yields the value "b" for the g-field. The g-census entry for the value "b" is looked up (544) to retrieve the location information A[5], which is compared with the set 528. The intersection of these sets is computed (546) and stored in the appropriate entry of the combined census 330'. The difference between the sets is empty in this case, but if it were not, the procedure would iterate to find additional values of the g-field paired with this particular value "q" of the f-field. When the set of records having the f-value "q" has been exhausted, the procedure moves to the next entry in the f-census, and the process iterates.

Figure 6:
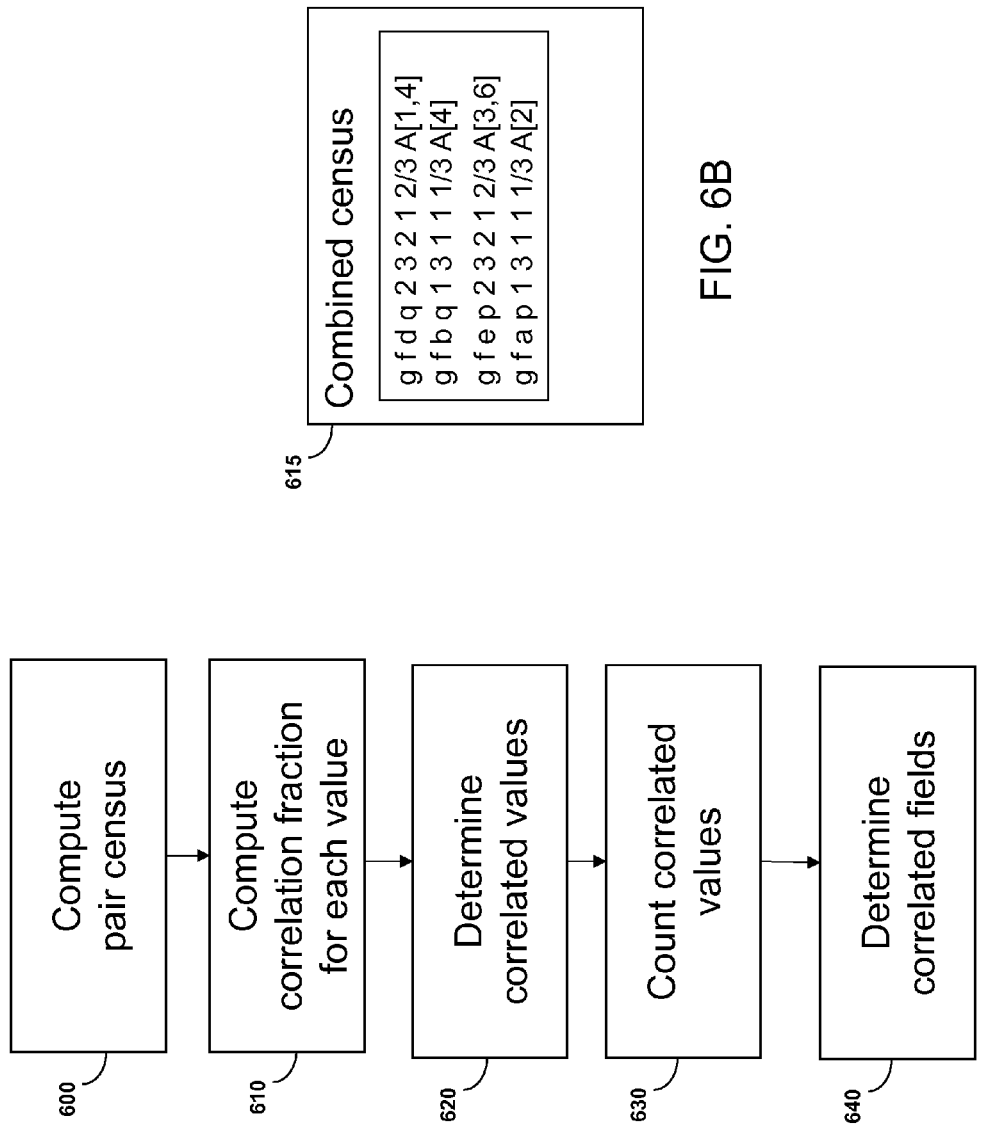
FIG. 6A is a flowchart for a procedure for determining functional dependency.
FIG. 6B is an example of a combined census with functional dependency information.

Referring to FIGS. 6A and 6B, the profiling module 106 is able to perform a procedure for determining correlation ("functional dependency") between values in pairs of fields, and to augment a combined census to include correlation fractions that quantify functional dependency result. A combined census for the pair of fields to be analyzed for potential functional dependency is computed (600) based on the individual censuses for the fields, as described above. For each value in each pair of values included in an entry of the combined census, a "correlation fraction" is computed (610), which represents the ratio of the number of records having that pair of values (the "pair count") to the number of records having that value (the "value count"). The profiling module 106 stores the correlation fractions ("1" and "⅔" in this example) in the entries to generate an augmented combined census 615. For example, the combined census entry "g f d q 2 3 2 A[1,4]" indicates that there are 2 records with the value "d" in the field "g", 3 records with the value "q" in the field "f", and 2 records with the pair of values "d q" located in the A-indexed dataset 310 by their indexes 1 and 4. The correlation fraction for the g-value "d" (paired with "q") is 2/2=1 while the correlation fraction for the f-value "q" (paired with "d") is 2/3.

The correlation fractions for each value are compared to a threshold to determine (620) which values are correlated at that threshold. For example, if the correlation fraction exceeds a threshold of 0.95, fewer than 5 out of 100 instances will have a different paired value than the current one. Here "d" is correlated to "q" at the 0.95 threshold but not the other way around: if the g-value is "d," then the corresponding f-value is sure to be "q," but if the f-value is "q", there is only a ⅔ chance the corresponding g-value is "d."

The total number of records associated with values (in one of the fields) correlated at a given threshold may be counted (630) and divided by the total number of records to determine (640) the fraction of records in the entire dataset that are correlated at the given threshold. If this fraction exceeds a second field-correlation threshold, the entire field is said to be correlated to the other field. In some implementations, the record counts contributing to the determination of field-correlation may exclude the count of records when the number of instances of a value is below a threshold or may report correlation based on such values as potentially spurious. This is because if the number of instances is too small, the correlation may be accidental or trivial, as for example when there is only a single instance of a value that is trivially correlated to its partner value.

The field-correlation calculation is repeated with the other field to determine the fraction of records correlated in the other direction. In this example, all of the g-values are individually correlated to an f-value, so the total number of correlated records is 6, the total number of records is 6, and the correlated fraction of records is 6/6=1. The conclusion is that "g" determines "f": knowledge of the g-value ensures knowledge of the corresponding f-value (at this field-correlation threshold). In contrast, no f-values exceed the correlation threshold, so that the f-field is not correlated to the g-field.

Figure 7:
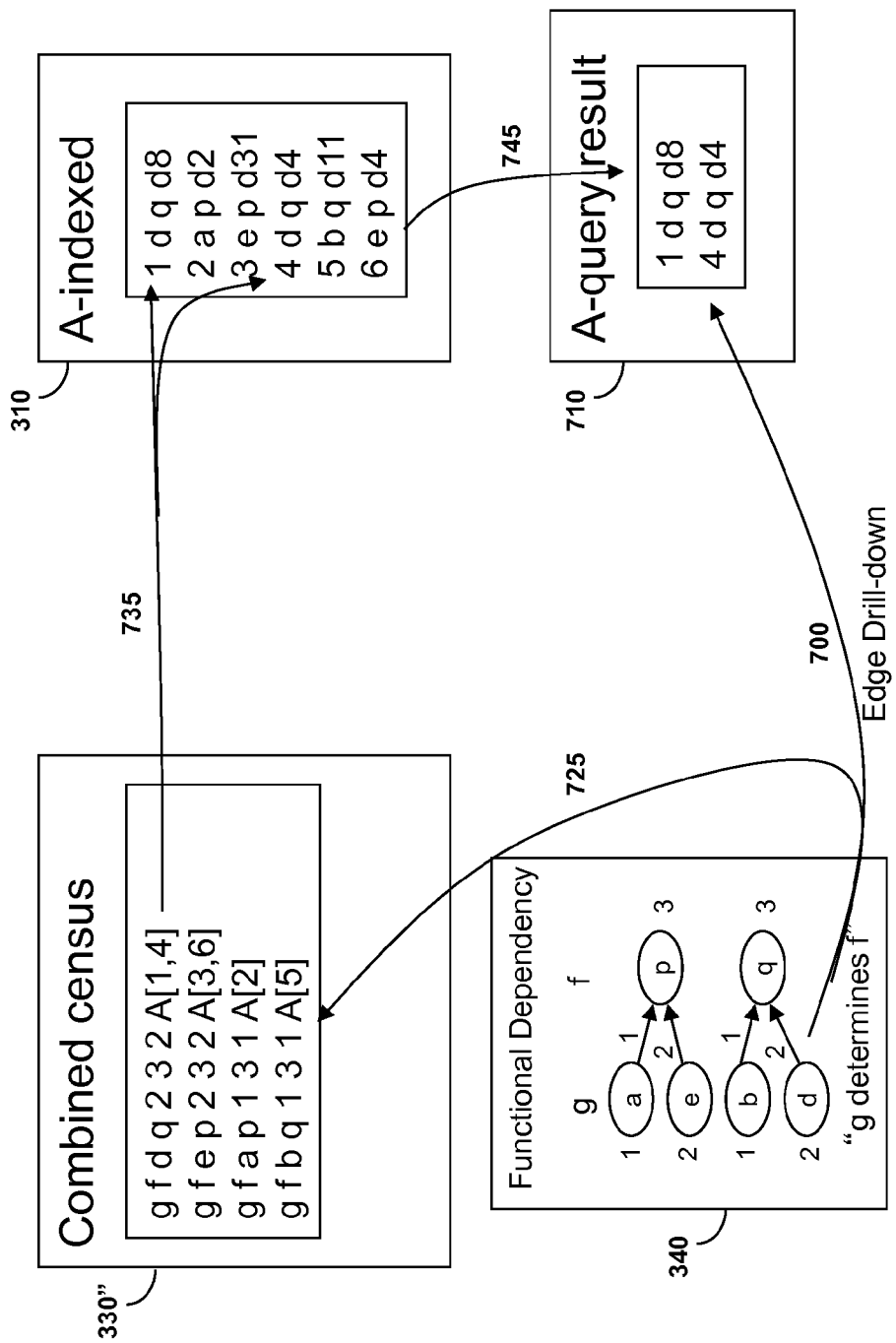
FIG. 7 is a schematic diagram of an edge drill-down procedure.

Referring to FIG. 7, an edge drill-down (700) from the functional dependency result 340 to an A-query result 710 is performed (e.g., in response to a user interaction with the displayed result 340 in a graphical user interface) to show more detailed information associated with the records represented by an edge in the displayed result 340 denoting a pair of values appearing in those records. The pair of values "d q" represented by the edge are looked up (725) in the combined census 330" (which is the same as the combined census 330 sorted by frequency of occurrence and sub-sorted by the first index of the location information) to obtain the location information for that pair. The location information is then used to retrieve (735) the associated records from the A-indexed dataset 310. These records are displayed (745) in the A-query result 710.

Figure 8A:
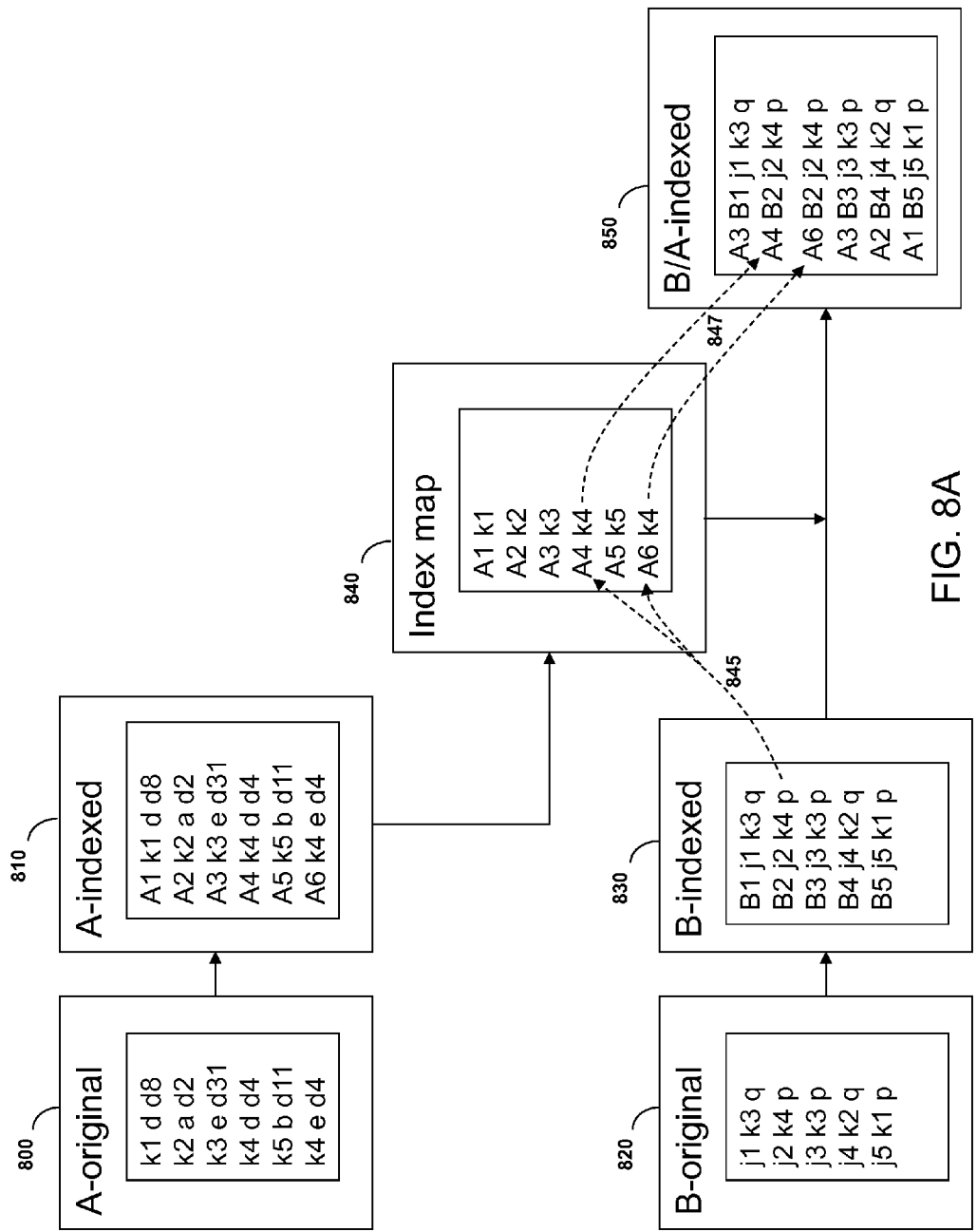
FIG. 8A is a schematic diagram of data for an index map.
Figure 8B:
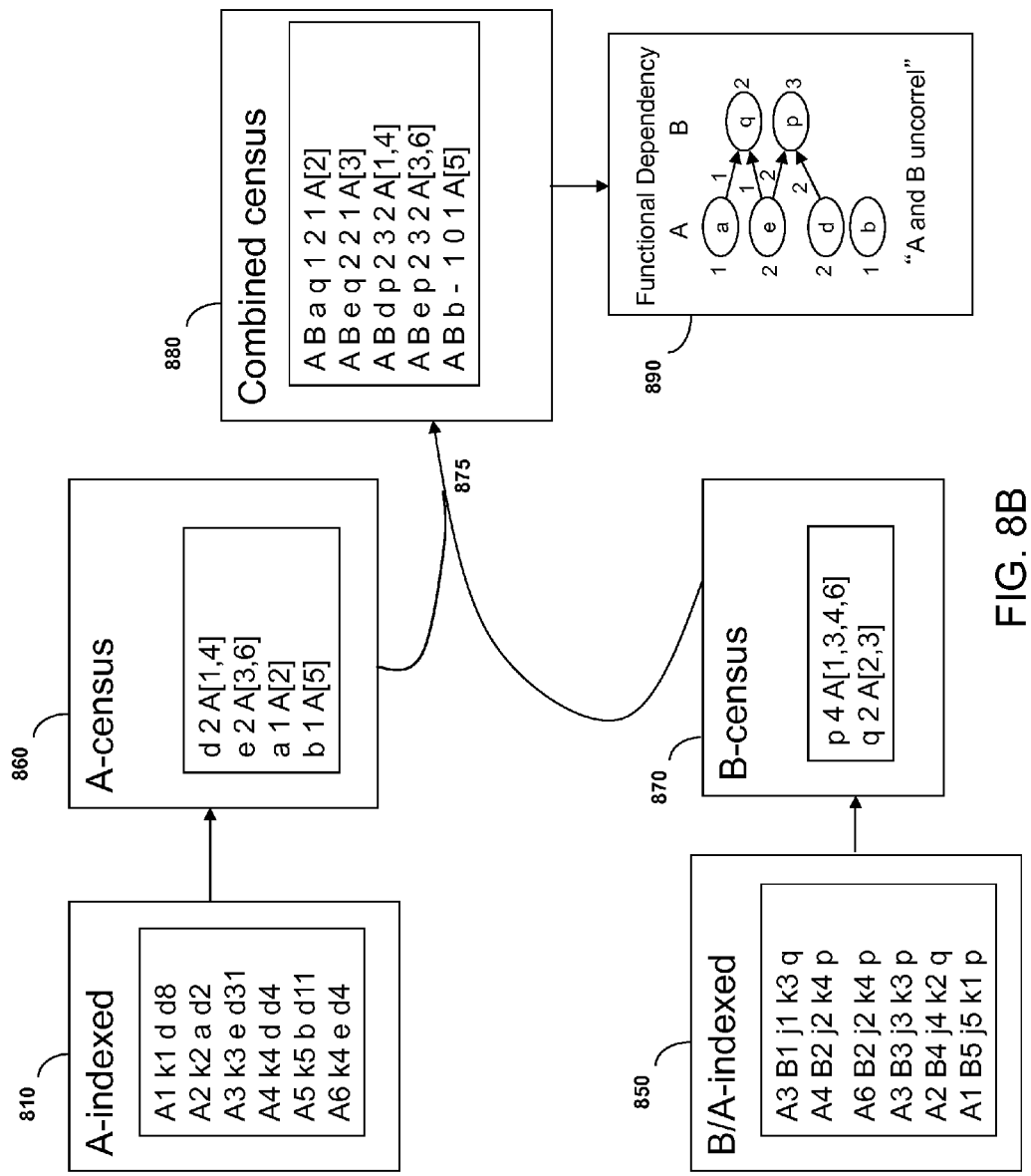
FIG. 8B is a schematic diagram of data for a functional dependency result.

In the previous example, the correlation of two fields (g and f) in the same dataset was computed. The computation of the correlation of two fields in different datasets linked by a key field is illustrated in FIGS. 8A and 8B. An A-original dataset 800 and a B-original dataset 820 each have three fields, and they each have one field that is a common key field. The key values of the common key field are not necessarily unique. But, the key values in the key field serve to relate corresponding records in the two datasets with the same key value in the respective key field. A unique identifier for each record in the A-original dataset 800 (called an A-record_id) is added as a field to each record to generate the A-indexed dataset 810. Similarly, a unique identifier for each record in the B-original dataset 820 (called a B-record_id) is added as a field to generate the B-indexed dataset 830. An index map 840 is used to associate each A-record_id with a key value in the key field of the same record. So, the index map 840 is a copy of the first two columns of the A-indexed dataset 810. The index map 840 may be stored separately from the A-indexed dataset 810, for example, in a file in the profiling data store 110.

In this example, the key field is a primary key of the A-original dataset 800 (shown in the first column of the A-original dataset 800 in FIG. 8A), and a foreign key of the B-original dataset 820 (shown in the second column of the B-original dataset 820 in FIG. 8A). The A-record_id values may be selected for mapping to its key field (instead of the B-record_id values to its key field) because that key field is a primary key. However, the datasets are not necessarily required to have such a primary-key/foreign-key relationship, as long as there is some field designated as a key field in each dataset. The index map 840 is useful because there may be duplicate primary key values in the A-dataset, as in this example, in which both datasets have a key field value repeated in two different records. Using the index map 840, the profiling module 106 generates a new version of the B-indexed dataset 830 with a new field containing values of the A-record_id so that both datasets have a common frame of reference for specifying location information. To do so, the profiling module 106 compares the key field values in the B-indexed dataset 830 to the key values in the index map 840 to find any number of matches to corresponding A-record_id values. In this example, one record from the B-indexed dataset 830 (having a foreign key value of "k4") is matched (845) to two different A-record_id values, and the profiling module 106 adds (847) two corresponding records when attaching the A-record_id to the records of the B-indexed dataset 830 to generate a B/A-indexed dataset 850 (one with "A4" added as an index, and the other with "A6" added as an index). The other records of the B-indexed dataset 830 are matched to a single A-record_id value in the index map 840, so they each correspond to a single respective record added to the B/A-indexed dataset 850, with the corresponding A-record_id value added as an index.

Referring now to FIG. 8B, an A-census 860 is computed for the third field of the A-indexed dataset 810, with location information referenced with respect to the A-record_id values (in the first field), and a B-census 870 is computed for the fifth field of the B/A-indexed dataset 850, also with location information referenced with respect to the A-record_id values (in the first field) that were added using the index map 840. The location information of the two censuses is combined (875) as described above to compute the combined census 880 for the pair of fields represented by the censuses (with the field from the A-census labeled "A" and the field from the B-census labeled "B"), which is subsequently used to display a functional dependency result 890 concluding that the A and B fields are uncorrelated.

Figure 9:
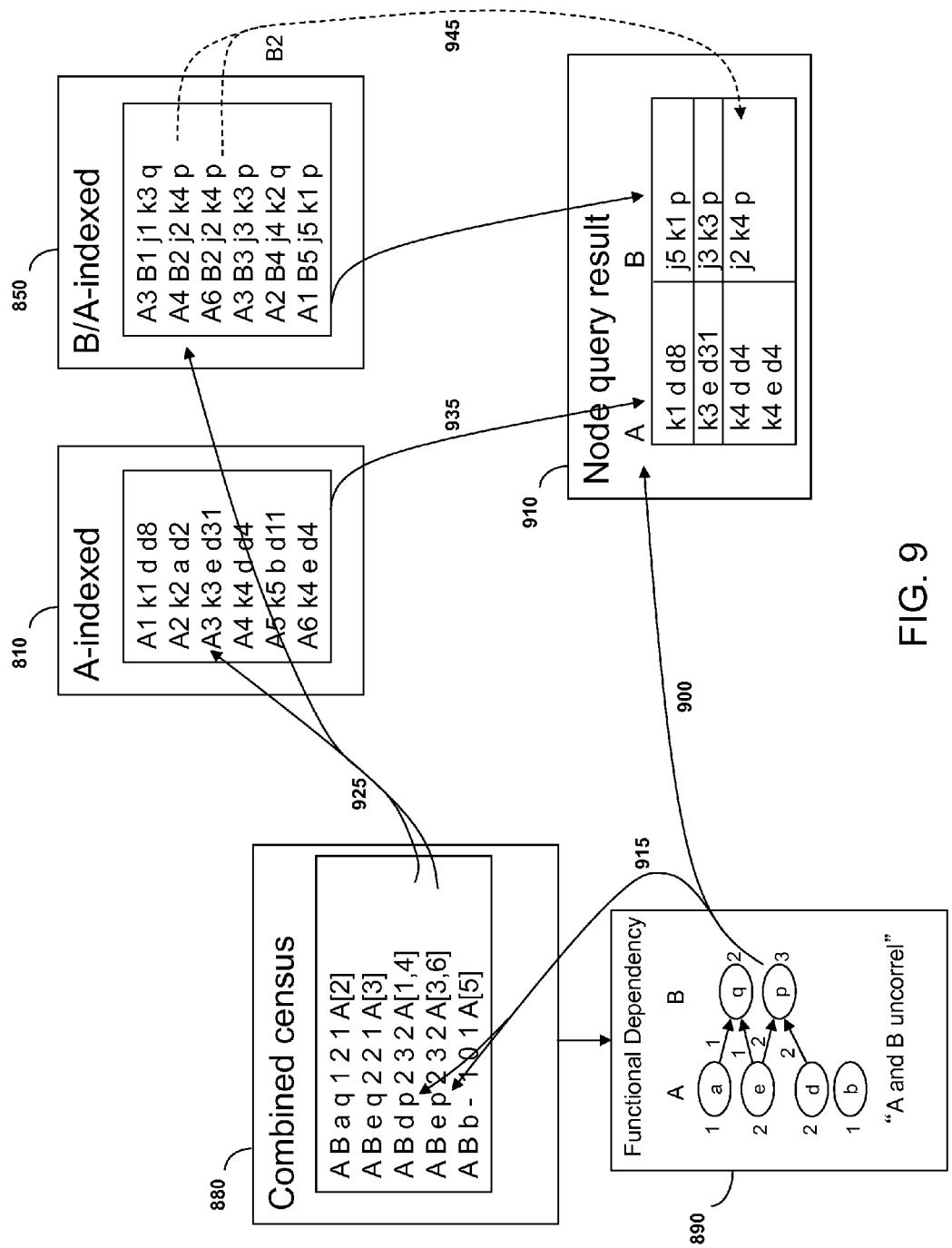
FIG. 9 is a schematic diagram of a node drill-down procedure.

Referring to FIG. 9, a node drill-down (900) from the functional dependency result 890 is performed (e.g., in response to a user interaction with the displayed result 890 in a graphical user interface) to show more detailed information associated with the records represented by the value displayed in the node. In response to selection of the node displaying the "p" value from the B field, the records corresponding to it from both the A-original dataset 800 and the B-original dataset 820 are retrieved and shown in a node query result 910. The drill-down is accomplished by first looking up (915) the "p" value in the combined census 880 to find each matching entry (containing a "p" for the B field). The location information for these entries is combined using a union to produce the location information (with respect to the A-record_id values) of A[1,3,4,6]. Each of these locations is then looked up (925) in both the A-indexed dataset 810 and the B/A-indexed dataset 850 to retrieve any records at those locations. The retrieved records in the A-indexed dataset 810 are displayed (935) in the node query result 910, labeled with "A". The retrieved records in the B-original dataset 820 are compared to find any that share the same B-record_id value, and any that do are de-duplicated (945) so that only one of them is displayed in the node query result 910. In this example, the records with A-record_id values of A4 and A6 have the same B-record_id value of B2. The duplicate key field value in the records from the A-original dataset 800 is shown in the node query result 910 by having multiple A-original dataset 800 records corresponding to a single B-original dataset 820 record.

Figure 10:
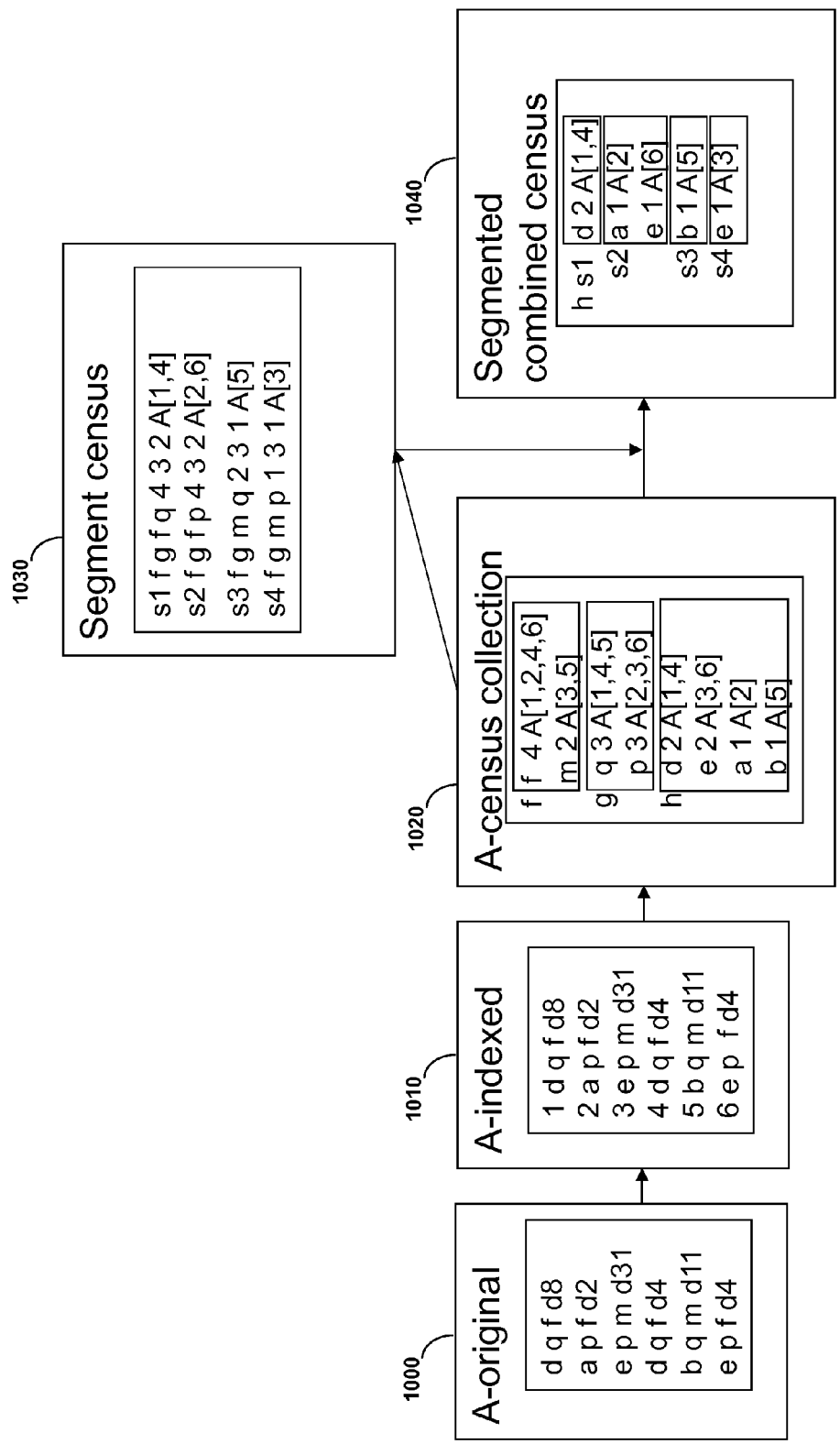
FIG. 10 is a schematic diagram of data for a segment census and segmented combined census.

In FIG. 10, an example of the computation of a census with segmentation is illustrated. An A-original dataset 1000 has three fields f, g, and h. A unique identifier for each record in the A-original dataset 1000 (called record_id) is added as a field to each record to generate an A-indexed dataset 1010. A collection 1020 of sorted censuses with location information for each of the three fields is computed. In some implementations, the system 100 may enable a user to form queries to answer business questions, such as what is the data profile (i.e., distribution of values) of the h-field in segments (i.e., subsets of fewer than all records in a dataset) given by restricting the combination of the f-field and g-field to contain specified values? For example, the f-field may represent gender with records having possible values "f" or "m" for the f-field, respectively; while the g-field may represent "foreign" or "domestic" with records having possible values "p" or "q" for the g-field, respectively. A data profile (e.g., as represented by a census) segmented on the f- and g-fields can facilitate answers to questions like, what is the most common value of the h-field for a "foreign male" or for a "domestic female"?

The collection 1020 can be used to compute the segmented profiles without requiring processing of all of the records in the A-original dataset 1000. A segment census 1030 can be constructed as a combined census using the f-field and g-field censuses and the procedure described above for computing a combined census. In some implementations, each entry in the segment census 1030 is given a unique value (called segment_id) for convenient identification of the segment associated with that entry. The procedure for computing a combined census is applied again to form a segmented combined census 1040, which is a combination of the h-field census from the A-census collection 1020 and the segment census 1030. For example, the h-s1 entry of the segmented combined census 1040 may be computed by first taking the s1 entry of the segment census 1030 and reading the associated location information A[1,4]. The first element "1" of the location vector is looked up in the census for the h-field in the A-census collection 1020 to find the h-field value "d" and the corresponding location information A[1,4]. The location information A[1,4] of the s1-labeled entry of the segment census 1030 is compared to the location information A[1,4] of the "d" entry of the h-census. Since all of the elements of the location information between these two entries match, the resulting combined census entry vector for the s1-segment is found to be "d 2 A[1,4]," and there are no remaining location entries in the s1-segment. This indicates that the s1-segment consists of only a single h-field value "d." Continuing to construct the combined census using the other segment values in combination with the h-census records fills out the segmented combined census 1040.

Figure 11:
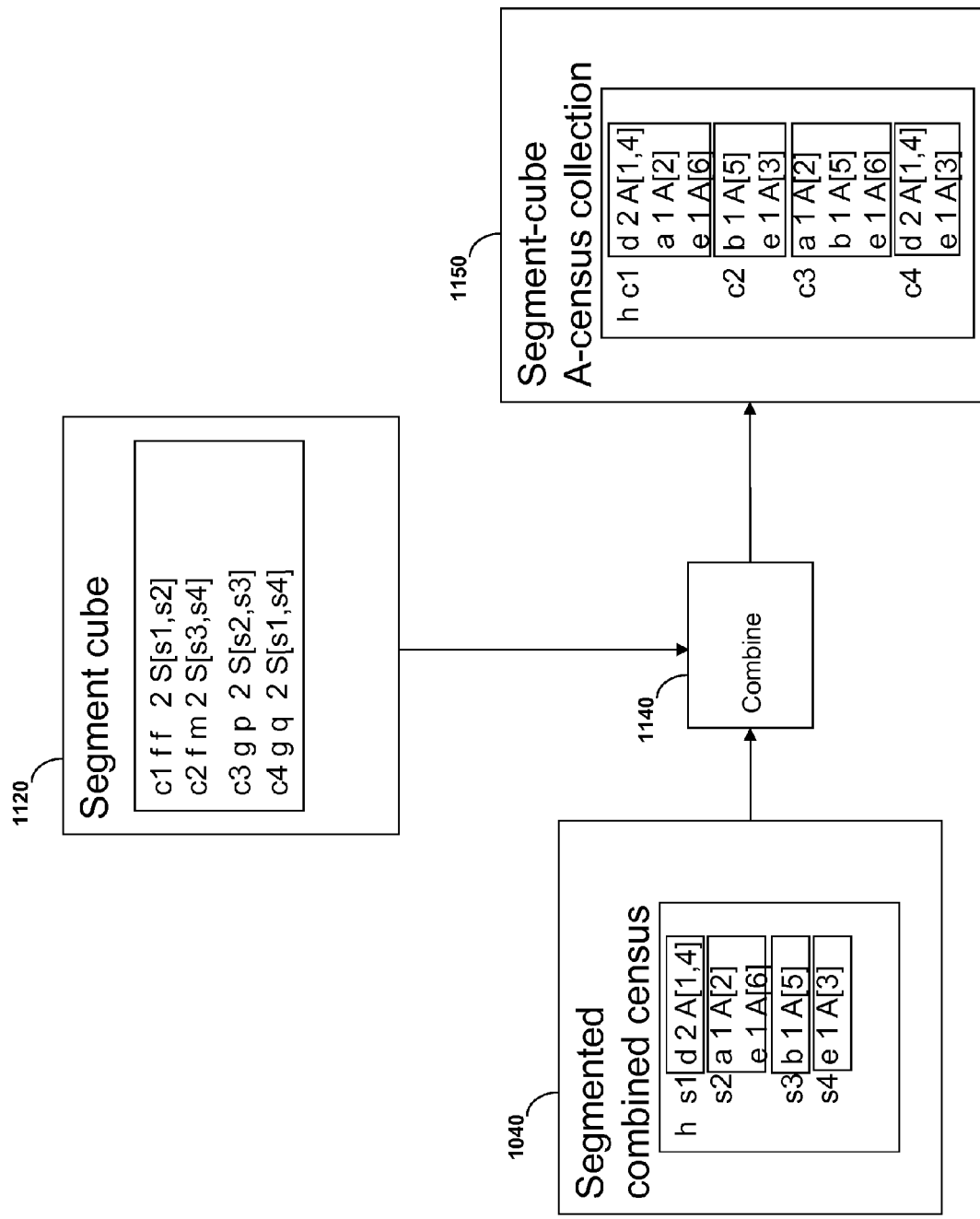
FIG. 11 is a schematic diagram of data for a segment cube.

In FIG. 11, an example of the computation of a segment cube is illustrated. When segmentation is based on a combination of the values of multiple fields as in the example of FIG. 10, a segment cube can be constructed in which the segmented census results are re-aggregated into census results for segments involving each combination of fewer fields. For the example of FIG. 10, the computed segmented combined census 1040 represents segments like "foreign male" (i.e., segment s4) and "domestic female" (i.e., segment s1). A user may ask for the profiles for the segments "foreign" or "male." Instead of returning to repeat the computation of FIG. 10 directly for the new segments, the previous segmentation results may be combined with the h-census to compute these other entries in a "segment cube" as follows.

To form a segment cube 1020, first every subset of the original segment fields are formed. In the current example, the full segmentation is based on the two segmentation fields f and g. There are two subsets of this set of two fields: the set consisting only of f and the set consisting only of g. Call each of these a segment-cube field. If the original segmentation fields consisted of three fields f, g and h, the segment-cube fields would be the sets {f,g}, {f,h}, {g,h}, {f}, {g}, and {h}, that is, the segment-cube fields are the members of the set of all (non-empty) subsets of the segmentation fields.

An entry in the segment cube 1120 consists of each distinct value (or combination of values) associated with each of the segment-cube fields. In some implementations, for each value of the segment-cube fields, the collection of segments containing that value is identified and held as segment location information in a data structure storing the segment cube 1120 along with the count of such segments. An alternative is to combine the location information with respect to the record_id added to the A-indexed dataset 1010 by taking the union for each corresponding entry of the segment census 1030 (called a segment-census entry). Using segment-location information (i.e., location information with respect to the segment_id) instead of A-location information (i.e., location information with respect to the record_id) can be more efficient because there are typically many fewer segments than records, so the location information will be more compact. In some implementations, a field is added to each entry of the segment cube 1120 to label the entry.

In the example, the segment-cube field f has the value "f" in segments s1 and s2, so the associated segment location information is S[s1,s2]. This forms the segment cube entry "c1 f f 2 S[s1,s2]." Here, c1 is the label of the segment-cube entry, the first f is the segment-cube field while "f" is its value. This value appears in two segments, identified by the location information S[s1,2]. Alternatively, the segment-cube field g has the value "q" in segments s1 and s4, so the associated segment location information is S[s1,s4]. The segment-cube entry is "c4 g q 2 S[s1,s4]."

The segmented combined census 1040 is combined (1140) with the segment cube 1120 to form a segment-cube A-census collection 1150 by the following procedure. Each entry in the segment cube 1120 contains the segment-location information identifying which segments contain the associated segment-cube field value(s). The union of the set of segment-census entries in each of the referenced segments gives the collection of census entries having the segment-cube field value. For example, the c1 segment cube entry has segment location information S[s1,s2]. The c1 segment result is formed by performing a union of the sets of census entries in the s1 and s2 results in the segmented combined census 1040. The s1 segment consists of a single entry "d 2 A[1,4]" while the s2 segment consists of two entries "a 1 A[2]" and "e 1 A[6]". The union of these entries is the set of all three entries and form the c1-segment of h-census of the segment-cube A-census collection 1150. From the segment cube, the c1-segment is seen to consist of those records for which the f field has the value "f". Therefore, the c1-segment of the h-census is that h-census segment in which the field f has the value "f". This can be confirmed by inspecting the A-census collection 1020 in FIG. 10. The f-field has the value "f" in records A[1,2,4,6] while the h-field has the value "d" on records A[1,4], "a" on record A[2] and "e" on record A[6].

If a value appears in more than one segment, then the A-location information for the result is formed from the union of the A-location information in each segment. This does not occur in the illustrated segment cube 1120, but if there were a segment-cube entry with segment-location information S[s2, s4], then because the "e" h-value occurs in both segments s2 and s4, the A-location information for the "e" h-value in that segment-cube census result would be A[3,6], that is, the union of the A[6] from the s2-segment and A[3] from the s4-segment.

A segment-cube entry like S[s2,s4] is an instance of a segment-cube entry in a more general segment cube formed by taking combinations of segments rather than simply combinations of fields. In some implementations, such segment combinations are allowed. In such an entry, the allowed segment-field values correspond to those values associated with each segment of the chosen combination of segments. In this example, a segment-cube entry of S[s2,s4] corresponds to a segment in which f-g fields either have the value "f p" or "m q." This enables complex segmentations to be formed in which conditional combinations of fields and field-values are allowed.

Multi-field validation rules may be computed from a census with location information without requiring processing of all of the records in the original datasets. A multi-field validation rule applies conditions to the values of two or more fields that must be satisfied simultaneously for a record to be deemed valid. Records that do not satisfy the condition are deemed invalid. An example of a multi-field validation rule is: if the f-value (gender) is "f," then the g-value (foreign/domestic) must be "p". In some implementations, validation rules are expressed in the negative, that is, a rule combining the values of two or fields is given which if satisfied identifies a record as invalid. In the present example, a rule identifying invalid records might be: if the f-value is "f" and the g-value is not "p", the record is invalid.

A data quality report may include counts of valid and invalid records for one or more validation rules. If the validation rules are specified before the initial census is taken, they may be verified during collection of the census and associated counts of valid and invalid records taken. However, often validation rules are proposed after an initial census in response to values and value combinations uncovered by the census. In this case, instead of retaking the census and applying the new validation rule, a census with location information can be used to identify valid and invalid records without re-computing the census. Because multi-field validation rules are expressed in terms of conditional combinations of field values, the census entries corresponding to each value in the validation rule may be combined, typically using Boolean operations on the location information, and used to check the rule. Any value combinations that are deemed invalid may be marked invalid and counted towards the collection of invalid records. The location information may also be used to drill down to identify specific records that are either valid or invalid under a validation rule.

Consider the validation rule, 'if the f-value is "f," the g-value must be "p".' The A-census collection 1020 can be used to compute the Boolean 'f="f" and g="p"'. This location information for records having f="f" is A[1,2,4,6] while the location information for those records having g="p" is A[2, 3,6]. The valid records are formed by the intersection of the two sets of the location information to give A[2,6]. The invalid records are those computed by the Boolean 'f="f" and g!="p"' resulting in invalid records located by the vector A[1,4]. The resulting location information can then be used to retrieve either valid or invalid records. For example, records 2 and 6 can be retrieved from the A-indexed file 1010 to return the two records which have f="f" and g="p."

The techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for profiling data stored in at least one data storage system, the method including:
    accessing at least one collection of records stored in the data storage system over an interface coupled to the data storage system; and
    processing the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
        receiving, for a second set of two or more fields of the collection of records, a corresponding list of entries, with each entry identifying (1) a distinct combination of values appearing in the second set of two or more fields, and (2) profile information for the distinct combination of values that includes location information that identifies, for each distinct combination of values, every record in the collection in which the distinct combination of values appears; and
        generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information.

2. The method of claim 1, wherein the list includes an entry for every distinct combination of values appearing in the second set of two or more fields.

3. The method of claim 2, wherein the first set of one or more fields does not include any fields from the second set of two or more fields.

4. The method of claim 3, wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields.

5. The method of claim 4, wherein the profile information from the first entry of the list includes location information that identifies every record in the collection in which the first distinct combination of values appears in the second set of two or more fields.

6. The method of claim 5, wherein the profile information for at least one field having at least one value different from the first distinct combination of values includes location information that identifies every record in the collection in which the at least one value appears in the first set of one or more fields.

7. The method of claim 4, wherein combining the first profile information and second profile information includes performing an intersection of the first profile information and second profile information.

8. The method of claim 2, wherein each entry in the list is associated with an index value for that entry that is unique among all of the index values associated with the entries in the list.

9. The method of claim 8, wherein the first set of one or more fields is a subset of fewer than all fields from the second set of two or more fields.

10. The method of claim 9, wherein combining first profile information from a first entry of the list having a first distinct combination of values, and second profile information for at least one field having at least one value different from the first distinct combination of values includes: combining first profile information from a first entry of the list having a first distinct combination of values, and second profile information from a second entry of the list having a second distinct combination of values.

11. The method of claim 10, wherein the first distinct combination of values and the second distinct combination of values have an identical value for a first field and different values for a second field, where the first field is in both the first set and the second set and the second field is in the second set but not in the first set.

12. The method of claim 10, wherein the first profile information includes a first index value associated with the first entry and the second profile information includes a second index value associated with the second entry.

13. The method of claim 1, wherein each entry further identifies a count of the number of records in which a distinct combination of values appears in the second set of two or more fields.

14. The method of claim 13, wherein the processing further includes sorting the entries in each list by the identified count.

15. The method of claim 1, wherein the result information includes location information that identifies, for each distinct combination of values appearing in the first set of one or more fields, every record in the collection in which the distinct combination of values appears.

16. The method of claim 1, wherein generating the location information for a distinct combination of values includes determining an intersection between location information for a first distinct value from the distinct combination of values and location information for a second distinct value from the distinct combination of values.

17. The method of claim 1, wherein the location information identifies a unique index value for every record in which the distinct value appears.

18. The method of claim 17, wherein the location information identifies a particular unique index value by storing that particular unique index value.

19. The method of claim 17, wherein the location information identifies a unique index value by encoding the unique index value within the location information.

20. The method of claim 19, wherein encoding the unique index value includes storing a bit at a position within a vector corresponding to the unique index value.

21. A computer program, stored on a computer-readable storage medium, for profiling data stored in at least one data storage system, the computer program including instructions for causing a computing system to:
 access at least one collection of records stored in the data storage system over an interface coupled to the data storage system; and
 process the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
  receiving, for a second set of two or more fields of the collection of records, a corresponding list of entries, with each entry identifying (1) a distinct combination of values appearing in the second set of two or more fields, and (2) profile information for the distinct combination of values that includes location information that identifies, for each distinct combination of values, every record in the collection in which the distinct combination of values appears; and
  generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information.

22. A computing system for profiling data stored in at least one data storage system, the computing system including:
 an interface coupled to the data storage system configured to access at least one collection of records stored in the data storage system; and
 at least one processor configured to process the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
  receiving, for a second set of two or more fields of the collection of records, a corresponding list of entries, with each entry identifying (1) a distinct combination of values appearing in the second set of two or more fields, and (2) profile information for the distinct combination of values that includes location information that identifies, for each distinct combination of values, every record in the collection in which the distinct combination of values appears; and
  generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information.

23. A computing system for profiling data stored in at least one data storage system, the computing system including:
 means for accessing at least one collection of records stored in the data storage system; and
 means for processing the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
  receiving, for a second set of two or more fields of the collection of records, a corresponding list of entries, with each entry identifying (1) a distinct combination of values appearing in the second set of two or more fields, and (2) profile information for the distinct combination of values that includes location information that identifies, for each distinct combination of values, every record in the collection in which the distinct combination of values appears; and
  generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information.

24. The computer program of claim 21, wherein the list includes an entry for every distinct combination of values appearing in the second set of two or more fields.

25. The computer program of claim 24, wherein the first set of one or more fields does not include any fields from the second set of two or more fields.

26. The computer program of claim 25, wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields.

27. The computer program of claim 26, wherein the profile information from the first entry of the list includes location information that identifies every record in the collection in which the first distinct combination of values appears in the second set of two or more fields.

28. The computer program of claim 27, wherein the profile information for at least one field having at least one value different from the first distinct combination of values includes location information that identifies every record in the collection in which the at least one value appears in the first set of one or more fields.

29. The computer program of claim 26, wherein combining the first profile information and second profile information includes performing an intersection of the first profile information and second profile information.

30. The computer program of claim 24, wherein each entry in the list is associated with an index value for that entry that is unique among all of the index values associated with the entries in the list.

31. The computer program of claim 30, wherein the first set of one or more fields is a subset of fewer than all fields from the second set of two or more fields.

32. The computer program of claim 31, wherein combining first profile information from a first entry of the list having a first distinct combination of values, and second profile information for at least one field having at least one value different from the first distinct combination of values includes: combining first profile information from a first entry of the list having a first distinct combination of values, and second profile information from a second entry of the list having a second distinct combination of values.

33. The computer program of claim 32, wherein the first distinct combination of values and the second distinct combination of values have an identical value for a first field and different values for a second field, where the first field is in both the first set and the second set and the second field is in the second set but not in the first set.

34. The computer program of claim 32, wherein the first profile information includes a first index value associated with the first entry and the second profile information includes a second index value associated with the second entry.

35. The computer program of claim 21, wherein each entry further identifies a count of the number of records in which a distinct combination of values appears in the second set of two or more fields.

36. The computer program of claim 35, wherein the processing further includes sorting the entries in each list by the identified count.

37. The computer program of claim 21, wherein the result information includes location information that identifies, for each distinct combination of values appearing in the first set of one or more fields, every record in the collection in which the distinct combination of values appears.

38. The computer program of claim 21, wherein generating the location information for a distinct combination of values includes determining an intersection between location information for a first distinct value from the distinct combination of values and location information for a second distinct value from the distinct combination of values.

39. The computer program of claim 21, wherein the location information identifies a unique index value for every record in which the distinct value appears.

40. The computer program of claim 39, wherein the location information identifies a particular unique index value by storing that particular unique index value.

41. The computer program of claim 39, wherein the location information identifies a unique index value by encoding the unique index value within the location information.

42. The computer program of claim 41, wherein encoding the unique index value includes storing a bit at a position within a vector corresponding to the unique index value.

43. The computing system of claim 22, wherein the list includes an entry for every distinct combination of values appearing in the second set of two or more fields.

44. The computing system of claim 43, wherein the first set of one or more fields does not include any fields from the second set of two or more fields.

45. The computing system of claim 44, wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields.

46. The computing system of claim 45, wherein the profile information from the first entry of the list includes location information that identifies every record in the collection in which the first distinct combination of values appears in the second set of two or more fields.

47. The computing system of claim 46, wherein the profile information for at least one field having at least one value different from the first distinct combination of values includes location information that identifies every record in the collection in which the at least one value appears in the first set of one or more fields.

48. The computing system of claim 45, wherein combining the first profile information and second profile information includes performing an intersection of the first profile information and second profile information.

49. The computing system of claim 43, wherein each entry in the list is associated with an index value for that entry that is unique among all of the index values associated with the entries in the list.

50. The computing system of claim 49, wherein the first set of one or more fields is a subset of fewer than all fields from the second set of two or more fields.

51. The computing system of claim 50, wherein combining first profile information from a first entry of the list having a first distinct combination of values, and second profile information for at least one field having at least one value different from the first distinct combination of values includes: combining first profile information from a first entry of the list having a first distinct combination of values, and second profile information from a second entry of the list having a second distinct combination of values.

52. The computing system of claim 51, wherein the first distinct combination of values and the second distinct combination of values have an identical value for a first field and different values for a second field, where the first field is in both the first set and the second set and the second field is in the second set but not in the first set.

53. The computing system of claim 51, wherein the first profile information includes a first index value associated with the first entry and the second profile information includes a second index value associated with the second entry.

54. The computing system of claim 22, wherein each entry further identifies a count of the number of records in which a distinct combination of values appears in the second set of two or more fields.

55. The computing system of claim 54, wherein the processing further includes sorting the entries in each list by the identified count.

56. The computing system of claim 22, wherein the result information includes location information that identifies, for each distinct combination of values appearing in the first set of one or more fields, every record in the collection in which the distinct combination of values appears.

57. The computing system of claim 22, wherein generating the location information for a distinct combination of values includes determining an intersection between location information for a first distinct value from the distinct combination of values and location information for a second distinct value from the distinct combination of values.

58. The computing system of claim 22, wherein the location information identifies a unique index value for every record in which the distinct value appears.

59. The computing system of claim 58, wherein the location information identifies a particular unique index value by storing that particular unique index value.

60. The computing system of claim 58, wherein the location information identifies a unique index value by encoding the unique index value within the location information.

61. The computing system of claim 60, wherein encoding the unique index value includes storing a bit at a position within a vector corresponding to the unique index value.

62. A method for profiling data stored in at least one data storage system, the method including:
accessing at least one collection of records stored in the data storage system over an interface coupled to the data storage system; and
processing the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
receiving, for a second set of two or more fields of the collection of records, a corresponding list of entries, with each entry identifying (1) a distinct combination of values appearing in the second set of two or more fields, and (2) profile information for the distinct combination of values; and
generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information;
wherein the list includes an entry for every distinct combination of values appearing in the second set of two or more fields;
wherein the first set of one or more fields does not include any fields from the second set of two or more fields;
wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and
wherein the profile information from the first entry of the list includes location information that identifies every record in the collection in which the first distinct combination of values appears in the second set of two or more fields.

63. The method of claim 62, wherein the profile information for at least one field having at least one value different from the first distinct combination of values includes location information that identifies every record in the collection in which the at least one value appears in the first set of one or more fields.

64. A computer program, stored on a computer-readable storage medium, for profiling data stored in at least one data storage system, the computer program including instructions for causing a computing system to:
access at least one collection of records stored in the data storage system over an interface coupled to the data storage system; and
process the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
receiving, for a second set of two or more fields of the collection of records, a corresponding list of entries, with each entry identifying (1) a distinct combination of values appearing in the second set of two or more fields, and (2) profile information for the distinct combination of values; and
generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of one or more fields based on the combined profile information;

wherein the list includes an entry for every distinct combination of values appearing in the second set of two or more fields;

wherein the first set of one or more fields does not include any fields from the second set of two or more fields;

wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and wherein the profile information from the first entry of the list includes location information that identifies every record in the collection in which the first distinct combination of values appears in the second set of two or more fields.

65. The computer program of claim 64, wherein the profile information for at least one field having at least one value different from the first distinct combination of values includes location information that identifies every record in the collection in which the at least one value appears in the first set of one or more fields.

66. A computing system for profiling data stored in at least one data storage system, the computing system including:

an interface coupled to the data storage system configured to access at least one collection of records stored in the data storage system; and at least one processor configured to process the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:

receiving, for a second set of two or more fields of the collection of records, a corresponding list of entries, with each entry identifying (1) a distinct combination of values appearing in the second set of two or more fields, and (2) profile information for the distinct combination of values; and generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information;

wherein the list includes an entry for every distinct combination of values appearing in the second set of two or more fields;

wherein the first set of one or more fields does not include any fields from the second set of two or more fields;

wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and wherein the profile information from the first entry of the list includes location information that identifies every record in the collection in which the first distinct combination of values appears in the second set of two or more fields.

67. The computing system of claim 66, wherein the profile information for at least one field having at least one value different from the first distinct combination of values includes location information that identifies every record in the collection in which the at least one value appears in the first set of one or more fields.

68. A computing system for profiling data stored in at least one data storage system, the computing system including:

means for accessing at least one collection of records stored in the data storage system; and means for processing the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:

receiving, for a second set of two or more fields of the collection of records, a corresponding list of entries, with each entry identifying (1) a distinct combination of values appearing in the second set of two or more fields, and (2) profile information for the distinct combination of values; and generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information;

wherein the list includes an entry for every distinct combination of values appearing in the second set of two or more fields;

wherein the first set of one or more fields does not include any fields from the second set of two or more fields;

wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and wherein the profile information from the first entry of the list includes location information that identifies every record in the collection in which the first distinct combination of values appears in the second set of two or more fields.

69. The computing system of claim 68, wherein the profile information for at least one field having at least one value different from the first distinct combination of values includes location information that identifies every record in the collection in which the at least one value appears in the first set of one or more fields.

70. A method for profiling data stored in at least one data storage system, the method including:
 accessing at least one collection of records stored in the data storage system over an interface coupled to the data storage system; and
 processing the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
  receiving, for a second set of two or more fields of the collection of records, a corresponding list of entries, with each entry identifying (1) a distinct combination of values appearing in the second set of two or more fields, and (2) profile information for the distinct combination of values; and
  generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information;
  wherein the list includes an entry for every distinct combination of values appearing in the second set of two or more fields;
  wherein the first set of one or more fields does not include any fields from the second set of two or more fields;
  wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and
  wherein combining the first profile information and second profile information includes performing an intersection of the first profile information and second profile information.

71. A computer program, stored on a computer-readable storage medium, for profiling data stored in at least one data storage system, the computer program including instructions for causing a computing system to:
 access at least one collection of records stored in the data storage system over an interface coupled to the data storage system; and
 process the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
  receiving, for a second set of two or more fields of the collection of records, a corresponding list of entries, with each entry identifying (1) a distinct combination of values appearing in the second set of two or more fields, and (2) profile information for the distinct combination of values; and
  generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information;
  wherein the list includes an entry for every distinct combination of values appearing in the second set of two or more fields;
  wherein the first set of one or more fields does not include any fields from the second set of two or more fields;
  wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and
  wherein combining the first profile information and second profile information includes performing an intersection of the first profile information and second profile information.

72. A computing system for profiling data stored in at least one data storage system, the computing system including:
 an interface coupled to the data storage system configured to access at least one collection of records stored in the data storage system; and
 at least one processor configured to process the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:
  receiving, for a second set of two or more fields of the collection of records, a corresponding list of entries, with each entry identifying (1) a distinct combination of values appearing in the second set of two or more fields, and (2) profile information for the distinct combination of values; and
  generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information;

wherein the list includes an entry for every distinct combination of values appearing in the second set of two or more fields;

wherein the first set of one or more fields does not include any fields from the second set of two or more fields;

wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and wherein combining the first profile information and second profile information includes performing an intersection of the first profile information and second profile information.

73. A computing system for profiling data stored in at least one data storage system, the computing system including:

means for accessing at least one collection of records stored in the data storage system; and means for processing the collection of records to generate result information characterizing values appearing in a first set of one or more fields of the collection of records based on profile information for one or more values, where profile information for a value appearing in a field that is being profiled summarizes the collection of records in which the value appears in the field that is being profiled, the processing including:

receiving, for a second set of two or more fields of the collection of records, a corresponding list of entries, with each entry identifying (1) a distinct combination of values appearing in the second set of two or more fields, and (2) profile information for the distinct combination of values; and generating the result information characterizing values appearing in the first set of one or more fields of the collection of records, based at least in part on: combining first profile information from a first entry of the list having a first distinct combination of values, and second profile information for at least one field having at least one value different from the first distinct combination of values, and determining profile information for at least one value appearing in at least one field of the first set of one or more fields based on the combined profile information;

wherein the list includes an entry for every distinct combination of values appearing in the second set of two or more fields;

wherein the first set of one or more fields does not include any fields from the second set of two or more fields;

wherein combining first profile information from a first entry of the list having a first distinct combination of values, and second profile information for at least one field having at least one value different from the first distinct combination of values includes: combining first profile information from a first entry of the list having a first distinct combination of values, and second profile information for at least one field of the first set of one or more fields; and wherein combining the first profile information and second profile information includes performing an intersection of the first profile information and second profile information.

* * * * *